United States Patent
Cutsforth et al.

(10) Patent No.: US 7,564,160 B2
(45) Date of Patent: Jul. 21, 2009

(54) BRUSH HOLDER APPARATUS, BRUSH ASSEMBLY, AND METHOD

(75) Inventors: Robert S. Cutsforth, Bellingham, WA (US); David L. Cutsforth, Cohasset, MN (US)

(73) Assignee: Cutsforth Products, Inc., Cohasset, MN (US)

( * ) Notice: Subject to any disclaimer, the term of this patent is extended or adjusted under 35 U.S.C. 154(b) by 0 days.

(21) Appl. No.: 12/206,874

(22) Filed: Sep. 9, 2008

(65) Prior Publication Data
US 2009/0001842 A1    Jan. 1, 2009

Related U.S. Application Data

(60) Continuation of application No. 12/191,783, filed on Aug. 14, 2008, which is a continuation of application No. 11/535,878, filed on Sep. 27, 2006, now Pat. No. 7,417,354, which is a division of application No. 11/378,155, filed on Mar. 17, 2006, now Pat. No. 7,122,935, which is a continuation of application No. 11/172,315, filed on Jun. 30, 2005, now Pat. No. 7,141,906, which is a continuation of application No. 10/322,957, filed on Dec. 18, 2002, now Pat. No. 7,034,430.

(60) Provisional application No. 60/342,175, filed on Dec. 18, 2001.

(51) Int. Cl.
*H02K 5/14* (2006.01)

(52) U.S. Cl. ............... 310/239; 310/240; 310/244; 310/245; 310/247

(58) Field of Classification Search .......... 310/239, 310/240, 244, 245, 247
See application file for complete search history.

(56) References Cited

U.S. PATENT DOCUMENTS

| 629,418 | A | 7/1899 | Baylis |
| 985,951 | A | 3/1911 | Sparks |
| 1,132,304 | A | 3/1915 | Cunningham |
| 1,488,574 | A | 4/1924 | Wagner |
| 1,488,575 | A | 4/1924 | Wagner |
| 2,840,732 | A | 6/1958 | Nottelmann et al. |
| 3,316,431 | A | 4/1967 | Manoni |

(Continued)

FOREIGN PATENT DOCUMENTS

EP       0847126 A1    6/1998

OTHER PUBLICATIONS

Documents depicting brush holder designs, sent by applicant on Apr. 5, 2002 (3 pgs.).

(Continued)

*Primary Examiner*—Quyen Leung
*Assistant Examiner*—Iraj A Mohandesi
(74) *Attorney, Agent, or Firm*—Crompton, Seager & Tufte, LLC

(57) ABSTRACT

Devices and methods of use for brush holder assemblies are disclosed. Brush holder assemblies including a mounting block and a brush holder are disclosed. Also illustrated is a brush holder assembly including a first portion in sliding engagement with a second portion. In some embodiments the brush holder includes a channel, such that at least a portion of the mounting block is disposed within the channel of the brush holder.

14 Claims, 22 Drawing Sheets

U.S. PATENT DOCUMENTS

| | | |
|---|---|---|
| 3,387,155 A | 6/1968 | Krulls |
| 3,432,708 A | 3/1969 | Bissett |
| 3,445,705 A | 5/1969 | Fuller et al. |
| 3,482,135 A | 12/1969 | Hurlin |
| 3,521,102 A | 7/1970 | Sen |
| 3,710,478 A | 1/1973 | Krulls |
| 3,842,302 A | 10/1974 | Apostoleris |
| 3,864,803 A | 2/1975 | Ohmstedt et al. |
| 3,867,659 A | 2/1975 | Seaburg |
| 3,898,492 A | 8/1975 | Vassos et al. |
| 3,967,148 A | 6/1976 | Walsh |
| 4,296,346 A | 10/1981 | Ooki et al. |
| 4,355,254 A | 10/1982 | Oki et al. |
| 4,409,508 A | 10/1983 | Ookie et al. |
| 4,420,705 A | 12/1983 | Kimberlin |
| 4,513,495 A | 4/1985 | Kimberlin |
| 4,633,552 A | 1/1987 | Eriksson |
| 4,663,552 A | 5/1987 | Ohmstedt |
| 5,159,222 A | 10/1992 | Southall |
| 5,939,812 A | 8/1999 | Wetzel |
| 5,949,175 A | 9/1999 | Cummins |
| 6,087,754 A * | 7/2000 | Berger ................ 310/240 |
| 6,124,652 A | 9/2000 | Karasa et al. |
| 6,133,665 A | 10/2000 | Prell et al. |
| 6,246,145 B1 | 6/2001 | Morimoto et al. |
| 6,255,955 B1 | 7/2001 | Blaettner |
| 6,326,716 B1 | 12/2001 | Niimi et al. |
| 6,356,004 B1 | 3/2002 | Porter et al. |
| 6,680,556 B2 | 1/2004 | Menz et al. |
| 6,824,577 B2 * | 11/2004 | Deshpande ........... 48/127.9 |
| 7,122,935 B2 * | 10/2006 | Custforth et al. ........ 310/239 |
| 7,218,028 B2 | 5/2007 | Annis et al. |
| 2005/0156477 A1 | 7/2005 | Bocka et al. |
| 2006/0119211 A1 | 6/2006 | Annis et al. |

OTHER PUBLICATIONS

Documents depicting various processes of electropolishing, sent by applicant on Dec. 17, 2002 (3 pgs.).

* cited by examiner

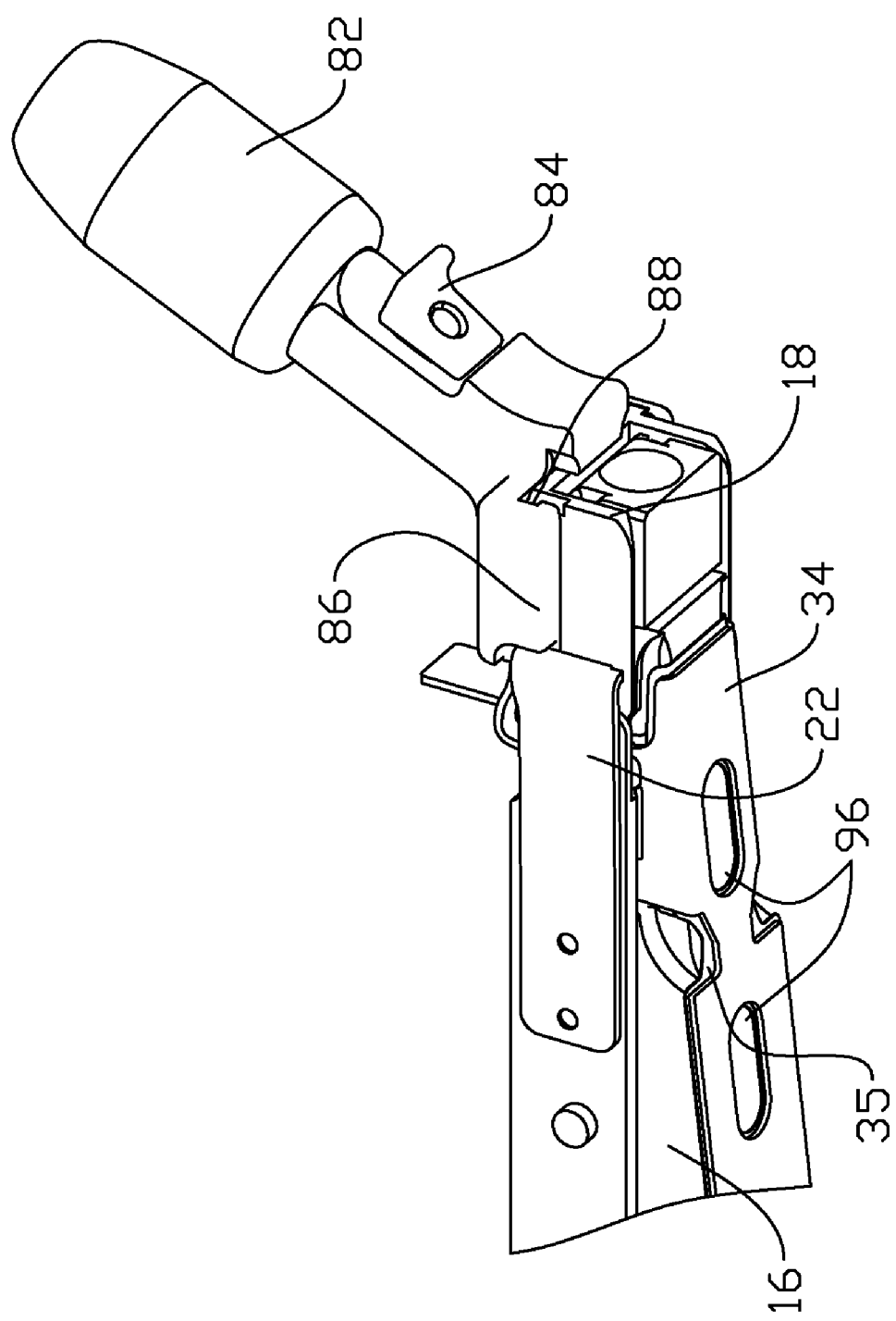

BRUSH HOLDER APPARATUS, BRUSH ASSEMBLY, AND METHOD

REFERENCE TO RELATED APPLICATIONS

This application is a continuation of co-pending U.S. patent application Ser. No. 12/191,783, filed on Aug. 14, 2008; which is a continuation of U.S. patent application Ser. No. 11/535,878, filed on Sep. 27, 2006, now U.S. Pat. No. 7,417,354; which is a divisional of U.S. patent application Ser. No. 11/378,155, filed on Mar. 17, 2006, now U.S. Pat. No. 7,122,935; which is a continuation of U.S. patent application Ser. No. 11/172,315, filed Jun. 30, 2005, now U.S. Pat. No. 7,141,906; which is a continuation of U.S. patent application Ser. No. 10/322,957, filed Dec. 18, 2002, now U.S. Pat. No. 7,034,430; which claims priority to provisional application 60/342,175, filed Dec. 18, 2001, all of which are incorporated herein by reference.

FIELD OF THE INVENTION

The invention relates to a brush assembly. More specifically, the invention relates to a brush holder assembly that may be used in electrical devices and/or slip ring assemblies.

BACKGROUND

The purpose of a brush in an electrical device is to pass electrical current from a stationary contact to a moving contact surface, or vice versa. Brushes and brush holders are used in electrical devices such as electrical generators and electrical motors of all sizes. They are also used on slip ring assemblies, for example, slip ring assemblies on a rotating machine such as a rotating crane. Brushes in many electrical devices are blocks or other structures made of conductive material, such as graphite, carbon graphite, electrographite, metal graphite, or the like, that are adapted for continuous contact with a conductive surface to pass electrical current. A brush typically includes one or more electrical shunts or wires to provide an electrical current path from the brush to other structure. Typically a brush assembly provides for continuing contact between a stationary brush and a moving conductive surface, or vice versa. Over time, the brush will be reduced in size, or get shorter, for example as the contact surface of the brush wears down. It would be desirable to provide a brush assembly that allows for continuing good contact even as the brush wears down, and which enables quick, safe replacement of brushes.

In many designs, a brush box type brush holder is used to support the brush during operation. The brush and box are designed such that the brush can slide within the box to provide for continuing contact between the brush and the conductive surface contacted by the brush. During wear of a brush, fine particles and/or dust can be created, which can collect on nearby surfaces and the inside of the brush box. Such material can create deposits of brush material on the inside of the brush box that can restrict sliding movement of the brush within the box, which in turn can reduce the quality of the contact between the brush and the contact surface. It would be desirable to provide a brush assembly that allows for a reduction of such restriction in movement of the brush. Additionally, it would be desirable to provide a brush assembly which does not allow current to pass through the box to thereby avoid detrimental effects, such as electrical erosion of the surfaces of the box, or collection of deposits on the surface of the box, which can restrict movement of the brush within the box.

Further, typically such boxes include a back plate which is used to enable a spring to press the brush against a conductive surface. It would also be desirable to provide a brush assembly which can function without requiring a back plate.

In some instances a brush may become so worn as to require replacement. In some such cases, for example in power generation, it may be difficult or expensive to stop the motion of the moving conductive surface to replace the brush. However, removal of the brush while relative motion between the brush and the conductive surface is ongoing can create a risk of arcing between the brush and the conductive surface, or can create a risk of accidental short circuiting the flow of electricity in other components. It would be desirable to provide a brush assembly that allows for safe, easy removal and replacement of a worn brush without requiring an adjacent collector ring, commutator or other moving part to be stopped.

SUMMARY

Some example embodiments relate to a brush holder and brush that can be readily removed from service without removing attachment hardware such as nuts or bolts. Additional example embodiments pertain to a brush holder that provides a mechanism for retaining a brush in the holder as the assembly is removed. In some such embodiments, the brush is contained within the brush holder assembly during removal, thereby providing for a more contained system that is easier to deal with and control during removal, thereby reducing the likelihood of accidental short circuiting of electrical current flow during a removal process. Additionally, in some such embodiments, the more contained system allows operations such as the removal of the brush assembly and/or the replacement or repair of a brush to be performed in a shorter period of time and with greater ease.

Other example embodiments relate to a brush holder including a replaceable contact system. Some example embodiments pertain to an assembly for attaching a brush spring while eliminating the need for back plate. Other example embodiments pertain to a brush holder using an insulation scheme to control the flow of current so that current does not pass through the brush box.

Some example embodiments pertain to a locking structure to ensure the holder stays locked in place. Several example locking structures include an over-center spring or tension-loaded device that does not release unless a force is applied to overcome the over-center force. Some example locking structures include a safety tab for interacting across a hinged or pivoting portion of a brush holder to prevent motion of the hinge or pivot unless a safety release device is used to release or move the safety tab.

Additional embodiments include features to prevent arcing between a brush and a conductive surface during removal of a brush while relative motion between the brush and the conductive surface continues. Some embodiments include mechanisms that allow for replacement of conductive and/or tension mechanisms within a brush holder structure when a brush wears out, simplifying the process of maintaining such elements. Some such embodiments provide for quick, unobstructed access to the inside of a brush box included in the assembly for cleaning and maintenance.

BRIEF DESCRIPTION OF THE DRAWINGS

FIG. 9 illustrates a perspective view of the interaction between a removal apparatus similar to that of FIG. 8 with a safety locking apparatus similar to that of FIG. 7 during a disengagement manipulation;

DETAILED DESCRIPTION OF SOME EMBODIMENTS

The following detailed description should be read with reference to the figures, in which like elements in different figures are numbered in like fashion. The figures, which are not necessarily to scale, depict selected embodiments and are not intended to limit the scope of the invention. In some cases, the figures may be highly diagrammatic in nature. Examples of constructions, materials, dimensions, and manufacturing processes are provided for various elements, but are not intended to limit such elements to particular manufactures. Those skilled in the art will recognize that many of the examples provided have suitable alternatives that may be utilized.

As used herein, the terms "upper portion" and "lower portion" are intended as merely illustrative terms which may provide a frame of reference for explanations of the drawings and claims. Merely placing an element "upside-down" does not change the inventive concepts herein. Also as used herein, the term "box" does not refer to a particular structure or enclosure. As illustrated in several of the Figures, a box may include a first side, a second side, and a center portion attached between and at approximately right angles to the first and second sides. Often the term box will refer to a shielding or other piece of material that may surround another element on several sides. The term "adjacent" includes relatively close proximity, but does not imply contact between two elements which are adjacent one another.

Figure 1:
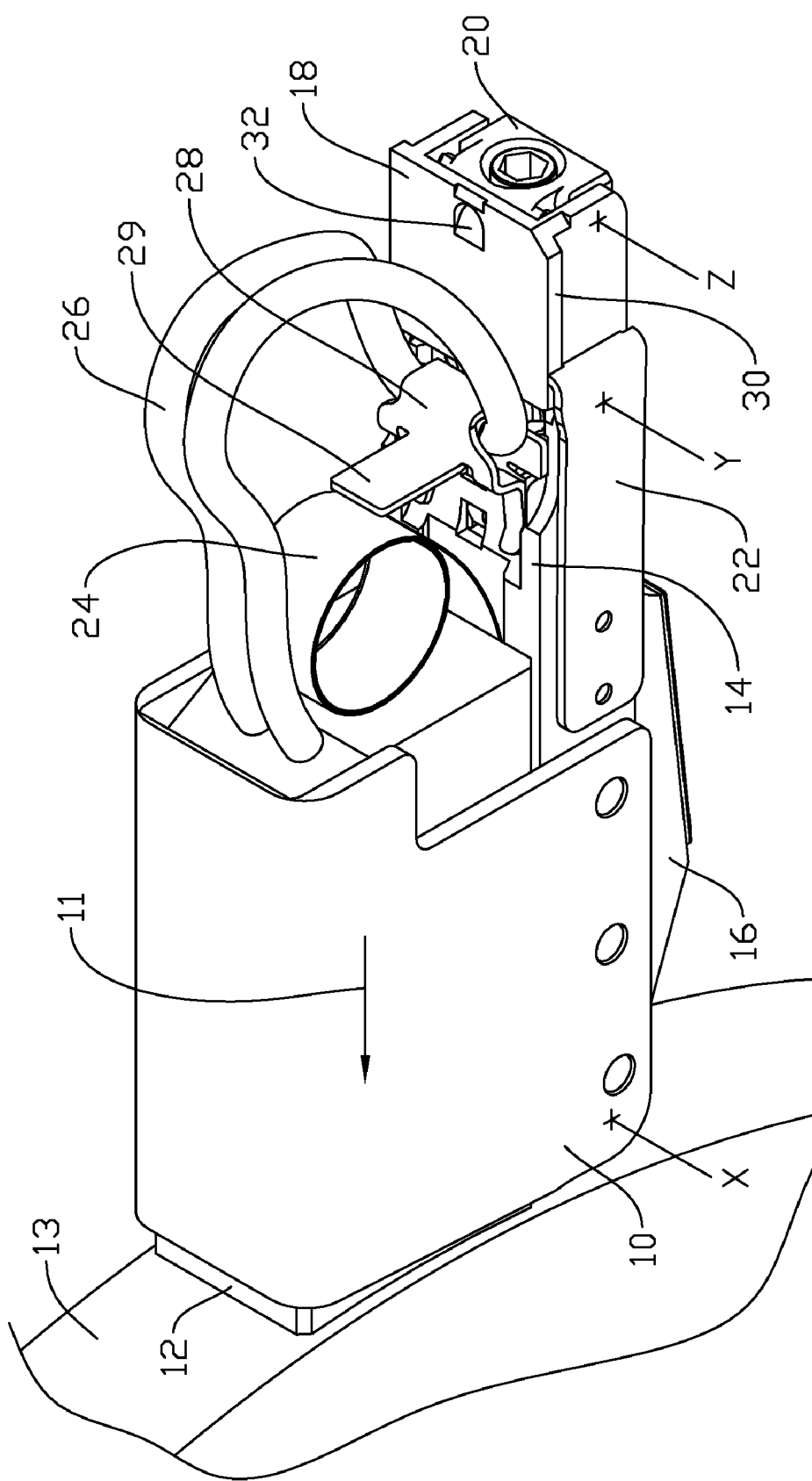
FIG. 1 is drawing showing a perspective view of a brush holder assembly in accordance with one example embodiment, showing the mounting bracket in an engaged configuration relative to the mount block.

The following detailed description is believed to describe a number of distinct inventions and inventive concepts. Each of the following inventions is illustrated herein as different aspects of one illustrative embodiment. The several inventions detailed below may be used in isolation from one another to accomplish a variety of tasks. Their inclusion in an individual example together should not be interpreted as requiring use of any one invention with any other inventive concept disclosed herein FIG. 1 is drawing showing a perspective view of a brush holder assembly in accordance with one example embodiment, showing a beam 14 in an engaged configuration relative to a lower mount block 16. As used herein, an engaged configuration is one in which a brush holder assembly is configured to place a brush such as the brush 12 in contact with a conductive surface 13, such as a surface of a collector ring or commutator, and conduct current therefrom. A brush box 10 surrounds the brush 12 on several sides, and is affixed to the beam 14. The box 10 includes inner surfaces that are adapted to slidingly engage the outer surfaces of the brush 12, and allow the brush to be biased into contact with the surface 13 when the beam 14 is in the engaged configuration relative to a lower mount block 16. The beam 14 is hingedly attached to the lower mount block 16. In several embodiments, the beam 14 may be completely removed/separated from the lower mount block 16. For example, the beam 14 may include one or more posts which fit into grooves in the lower mount block 16, the post being part of the beam 14 to create pivot line X.

The beam 14 is also hingedly attached to an upper beam 18. The hinged attachment may be at about pivot line Y. The upper beam 18 couples to an upper mount block 20, forming another hinge corresponding to pivot line Z. The upper mount block 20 engages the lower mount block 16 as better seen in FIG. 2. A safety catch 22 is fixed to the beam 14 as well, and extends past pivot line Y to pass alongside the upper beam 18. A portion of the safety catch 22 can engage a ledge 30 which is a part of the upper beam 18. A notch 32 is also part of the upper beam 18. Some illustrative examples of characteristics and methods for using the safety catch 22 and notch 32 are further noted below in text associated with FIGS. 7-9 and 15A-15B.

Figure 3:
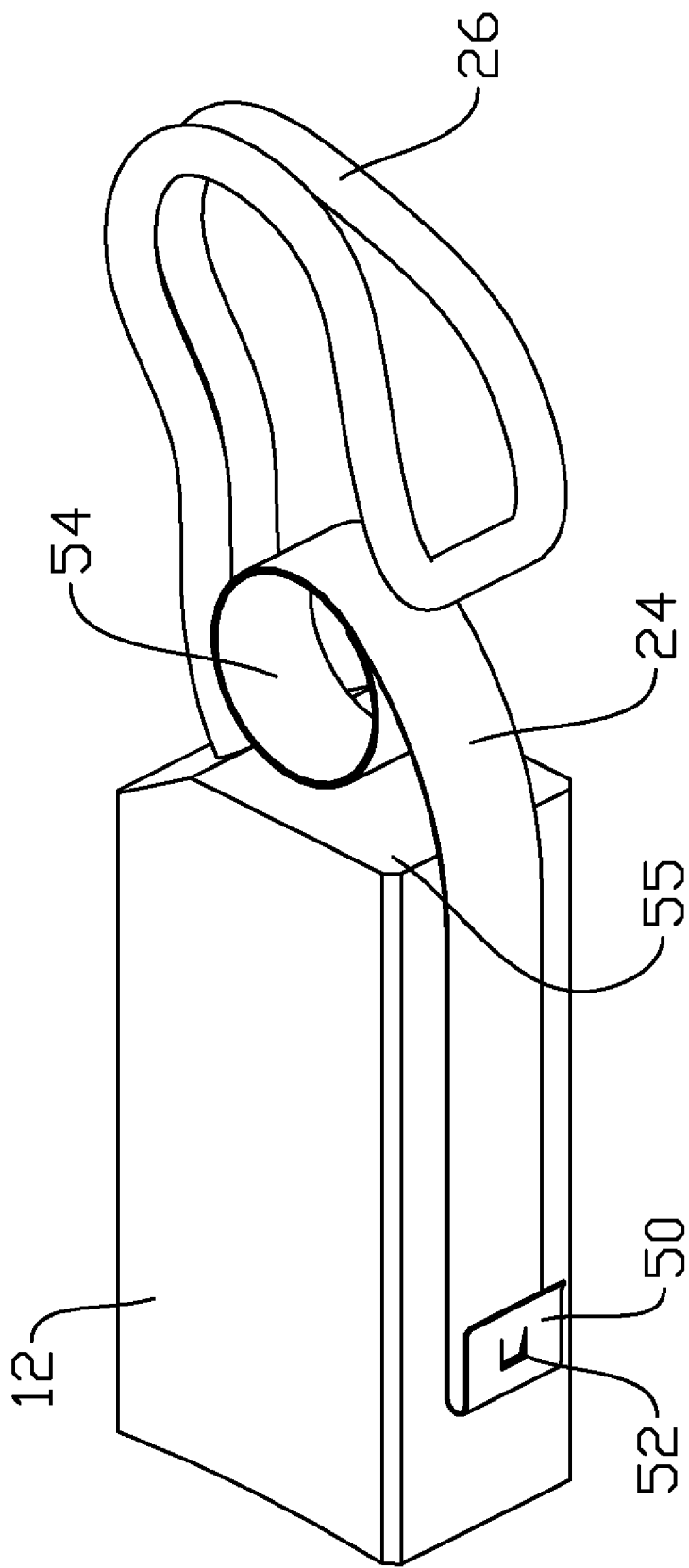
FIG. 3 illustrates a perspective view of an example brush and spring for use with several embodiments.
Figure 4A:
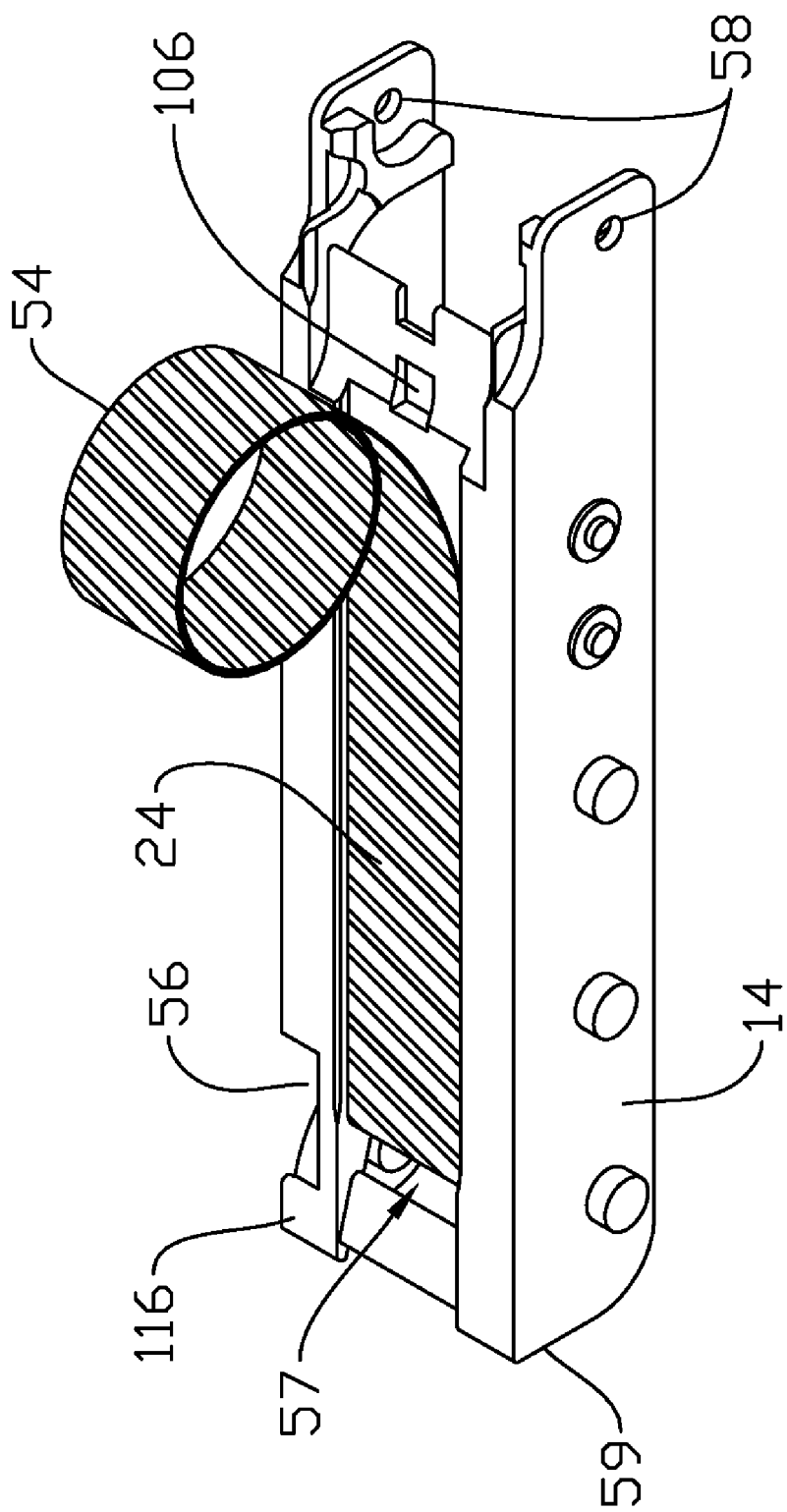
FIGS. 4A-4B illustrate perspective views of attachment of a spring similar to that shown in FIG. 3 to an illustrative beam of an example brush holder assembly.
Figure 4B:
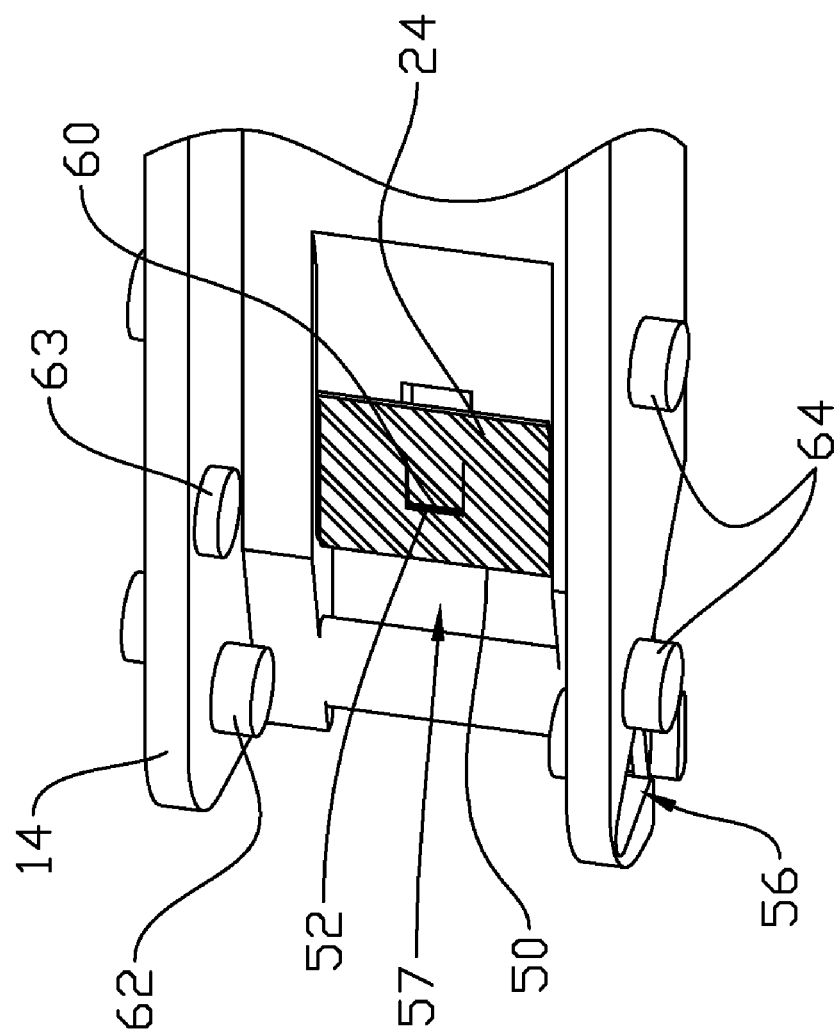

Also illustrated in FIG. 1 is a brush spring 24, which attaches to the beam 14, for example as shown in FIGS. 4A-4B. The brush spring 24 provides tension to the brush 12, as noted below in FIG. 3, to bias the brush toward the conductive surface 13, such as the surface of a collector ring or commutator. The inner surfaces of the box 10 that engage the brush are adapted or configured to allow the brush 12 to slide within the box. One or more brush conductor or shunt 26 provides a current path for electrical signal from the brush 12.

In some applications, it may be useful to direct current from the brush 12 to another location without passing the current through the brush box 10, for example, to reduce electrical erosion of the surfaces of the box 10. As shown, a brush conductor 26 couples to a terminal 28, which is another portion of a current path provided in several embodiments, as further highlighted in FIGS. 5-6.

The various elements noted in FIG. 1 may be constructed of any of a variety of suitable materials. In some embodiments, one or more of the box 10, beam 14, lower mount block 16, upper beam 18 and upper mount block 20 may be constructed of a metal such as stainless steel, for example heat treated stainless steel, to provide high strength, durability, and corrosion resistance. However, other materials, including other metals, non-metals, plastics and/or composites may also be used. In some embodiments, different parts may be of different materials having different properties, for example, the box 10 may be a non-conductive, light-weight composite, while the beam 14 and lower mount block 16, which must withstand the greatest forces within the design, are made of more durable metals such as high tensile strength steel.

Several parts may also include non-conductive or conductive coatings, polishes, anti-corrosive coatings, or coatings such as Teflon or the like, which may inhibit accumulation of dirt and/or debris, inhibit corrosion, or provide a smooth or slippery surface. Several parts may also include surfaces that have been treated or finishing to inhibit accumulation of dirt and/or debris, inhibit corrosion, or provide a smooth or slippery surface.

For example, some embodiments may include one or more components or parts that include a surface that is electropolished. Electropolishing is a nonmechanical method of polishing metal surfaces that is actually the reverse of electroplating. It is an electro-chemical process that mechanically restructures the surface of a metal by expelling electrons from the exposed surface and causing a smoothing reaction. Surface metal is removed by anodic dissolution. This is achieved by making the object or portion of the brush holder assembly to be polished the anode in an electrolytic circuit, the cathode being of suitable material, for example, copper, carbon, or the like. The cathode is typically assembled to mirror the surface of the piece being polished. The electrode potential of the metal piece is altered, typically within a heated electrolyte bath. Suitable electrolytes are used, for example, polishing acids, for example, phosphoric, hydrofluoric, nitric, or sulfuric acids, or the like, or combinations thereof. The anode and cathode are typically submersed in a plating bath including the electrolytes, and an electrical current is passed through the system to dissolve material from the surface of the anode, and deposit material onto the cathode. The plating bath may be heated, as is generally known, and agitation of the system can be created, for example, through blowing air through the bath.

One aspect to the electropolishing process is the difference in current densities across the microscopic surface being treated. The current density is greatest at high points and lowest at the low points. The rate of the electrochemical reaction is directly proportional to the current densities. The increased current density at the raised, or high points causes metal to dissolve faster at these points and thus levels, or smoothens, the surface material.

In some embodiments, the process is so refined that removal of material can be controlled within the range of about 0.0001 inch to about 0.0005 inch. Some surfaces can be obtained that become non-particulating surfaces, for example, that are so smooth that at least some particles cannot be entrapped and adhere to the metal surface. Additionally, electropolishing can promote corrosion resistance by removing surface contaminants and promoting the formation of a uniform and protective passive oxide layer.

Such surface treatments or coatings can be particularly useful when applied to or used on the inner surfaces of the brush box 10 that may come into contact with the surfaces of the brush 12. It is desirable that the brush 12 is able to slide within the box 10 to be biased into contact with the surface 13 when the beam 14 is in the engaged configuration relative to a lower mount block 16. Such coatings or treatments may enhance and preserve the ability of the brush to slide within the box. For example, if the inner surface of the brush box is polished, coated, or treated as discussed above, in at least some embodiments, there will be less likelihood that particles and/or dust can collect on the surfaces on the inside of the brush box and create deposits that can restrict movement of the brush within the box. Additionally, the polished, coated or treated surfaces may be smoother or more lubricious, and therefore allow for better movement of the brush within the box.

Figure 15A:
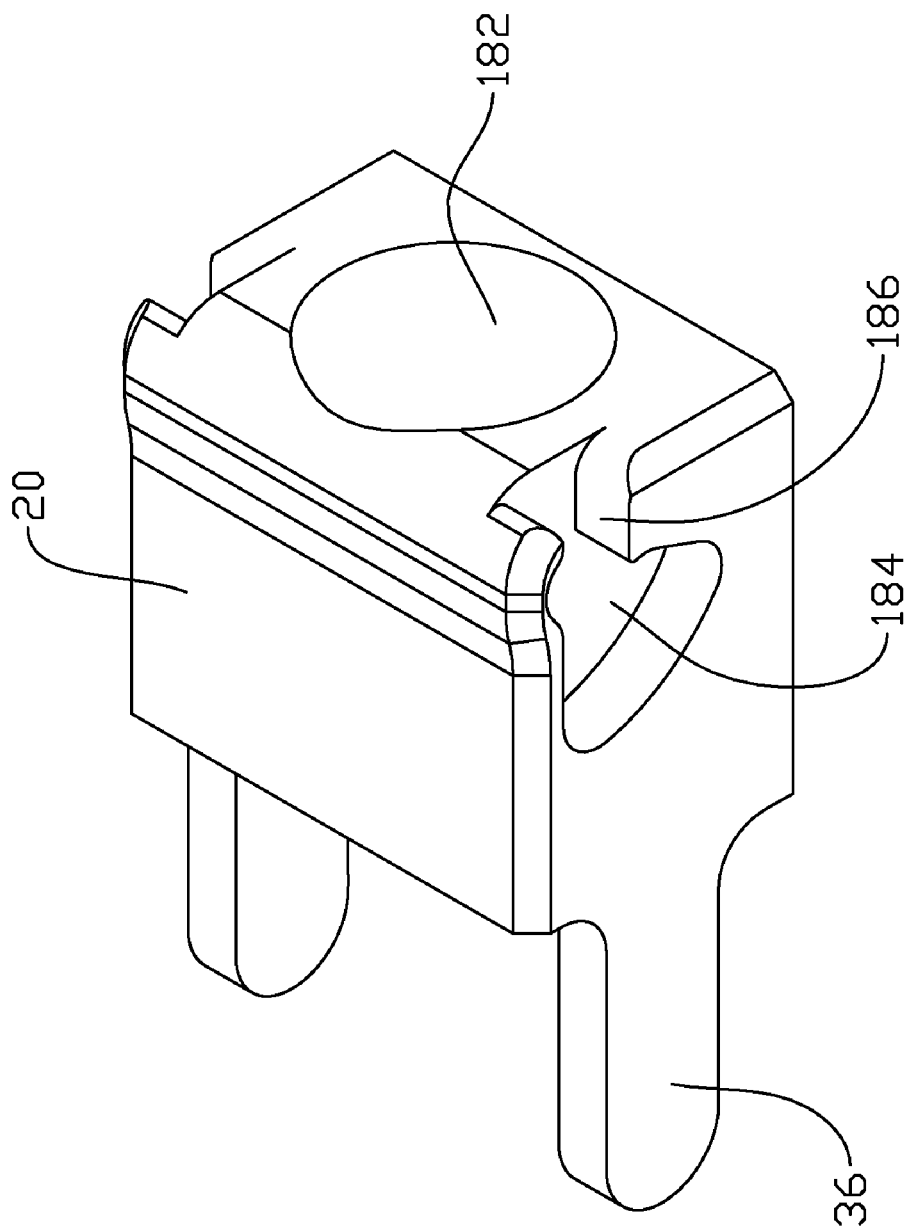
FIG. 15A illustrates an upper mount block which can be attached to the lower mount block illustrated in FIG. 14.
Figure 15B:
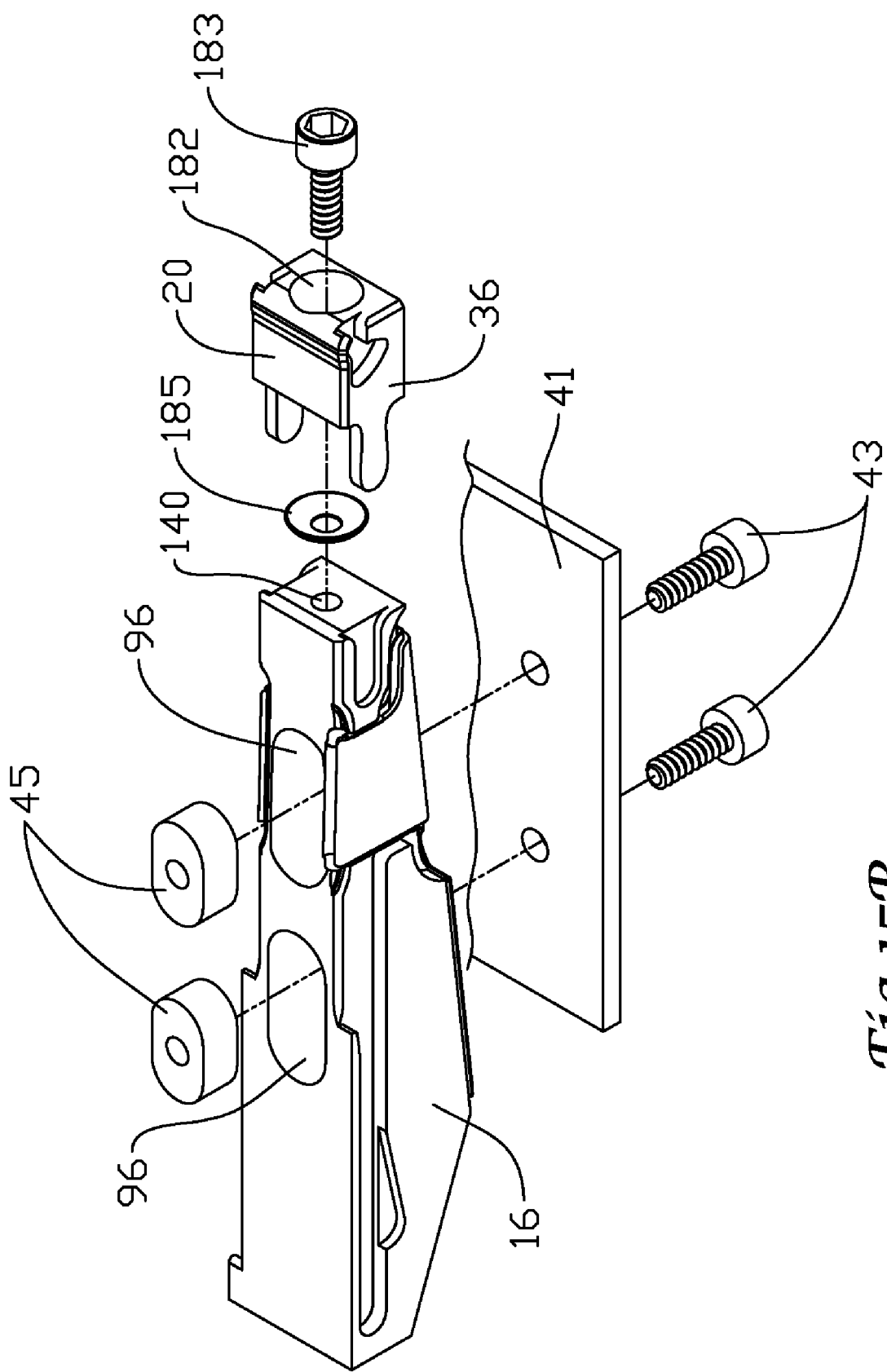
FIG. 15B illustrates a partially exploded view of attachment of upper mount block of FIG. 14 to the lower mount block of FIG. 15A, and attachment of lower mount block to a mount base.

In an illustrative use of the embodiments shown in FIG. 1, the lower mount block 16 may be attached to a fixed mount (for example, as shown in FIG. 15B). Referring back to FIG. 1, the mount may be placed close relative to a moving conductive surface 13 such as the surface of a collector ring or commutator, for example, in uses having a slip ring, in generators, or in an electric motor. The mount may be placed such that, when the "engaged" embodiment as shown in FIG. 1 is attached to a mount, the brush 12 is forced or biased against a moving conductive surface 13. In other embodiments, the lower mount block 16 may be affixed to a moveable mount which then moves with respect to a fixed conductive surface. In still other embodiments, relative motion between a mount and a conductive surface may include movement of both elements.

The brush spring 24 provides force that pushes the brush 12 toward the bottom edge of the brush box 10 as shown by arrow 11. The force provided by the brush spring 24 may be augmented by other biasing structures in some embodiments, while in other embodiments the brush spring 24 may by itself provide force to the brush 12 without other structure.

The brush 12 is shown extending past the bottom edge of the brush box 10. This enables a portion of the brush 12 to be supported by the brush box 10, while also allowing the brush 12 to engage and contact an adjacent conductive surface 13 without damaging the bottom of the brush box 10.

Figure 2:
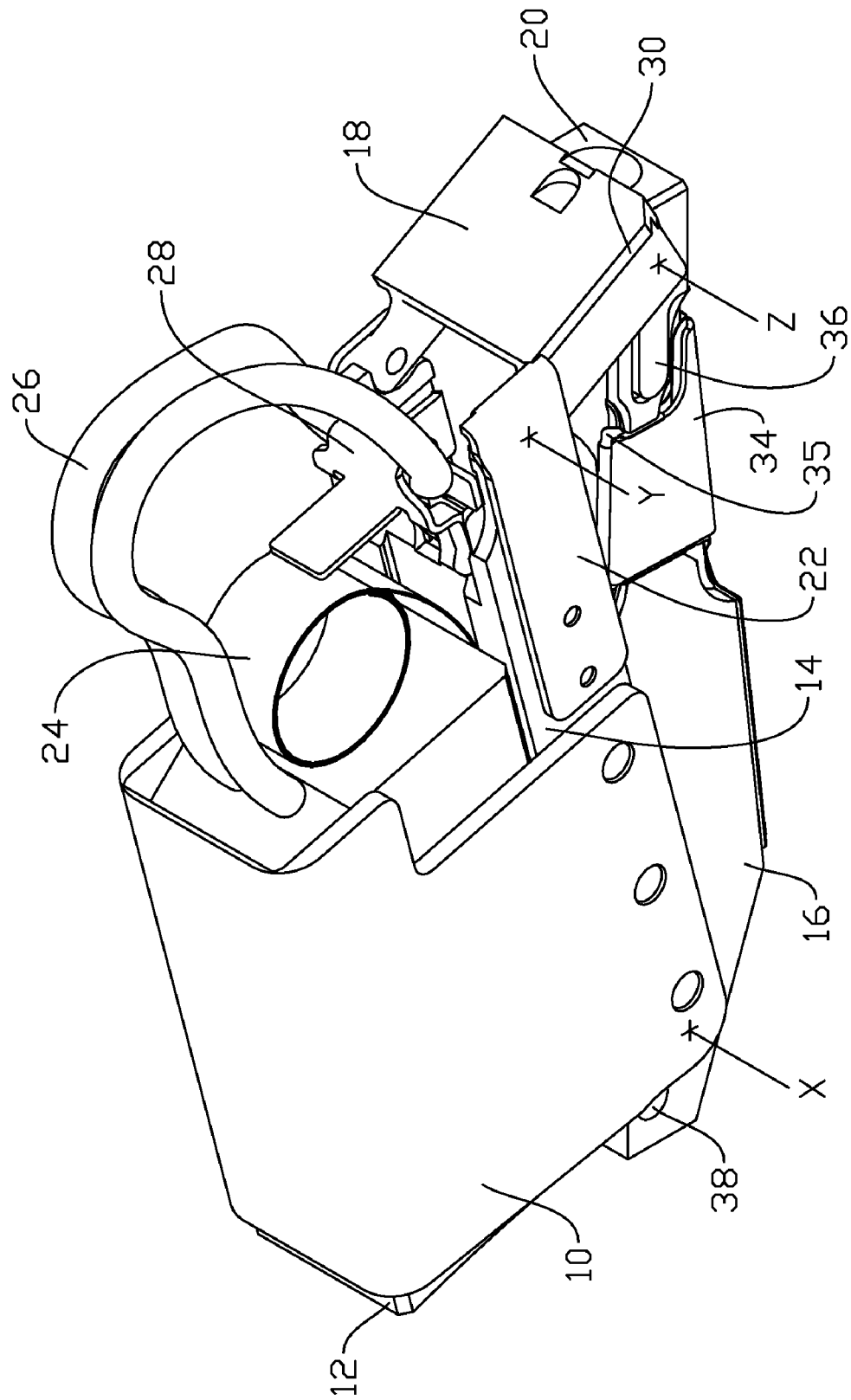
FIG. 2 is a drawing showing a perspective view of the brush holder assembly of FIG. 1, showing the mounting bracket in a disengaged configuration relative to the mount block.

FIG. 2 is a drawing showing a perspective view of the brush holder assembly of FIG. 1, showing the beam 14 in a disengaged configuration. Again illustrated is the brush box 10 which houses the brush 12 and is affixed to the beam 14. In a transition from the engaged configuration of FIG. 1 to the disengaged configuration of FIG. 2, hinging action takes place at each pivot line X, Y, and Z. Notably, lines X and Y have moved with respect to the lower mount block 16. Movement of the bottom of the brush box 10 exposes a groove 38, which may be included to allow a post on beam 14 to slidably fit in the groove 38 to create pivot line X.

While the brush spring 24 continues to apply force to the brush 12, a brush catch mechanism (not shown in FIG. 2 but an illustrative example is detailed in FIGS. 11 and 12) prevents downward movement of the brush 12. Also in FIG. 2, the safety catch 22 is disengaged with respect to the ledge 30 of the upper beam 18, as will be further discussed below.

The movement of the beam 14, safety catch 22 and upper beam 18 also exposes several additional aspects. The upper mount block 20 is shown to engage with the lower mount block 16 with a fork 36. The upper mount block 20 can also be attached to the lower mount block 16 using any suitable attachment mechanism, such as a bolt or screw, or the like, for example, as shown and discussed below with reference to FIG. 15B. In other embodiments the upper mount block 20 and lower mount block 16 can be fused together or provided as a single piece.

Referring to FIG. 2, a conductor strap 34 is also illustrated, the conductor strap 34 being placed optionally over an insulator 35 which insulates the lower mount block 16. The insulator 35 prevents current passing via the brush 12 from passing through the lower mount block 16. The conductor strap 34, when the device is "engaged" as shown in FIG. 1, contacts the terminal 28, providing a conductive path from the brush 12 through the brush conductor 26, the terminal 28 and finally the conductor strap 34. The conductive path thus avoids the brush box 10 as well as the beam 14, lower mount block 16, upper mount block 20, and upper beam 18.

To further control current passage, various elements including in particular the beam 14 and brush box 10 may in some embodiments be constructed of or coated with non-conductive materials. Also, in some embodiments, the brush spring 24 may likewise be coated or constructed to prevent current passage.

Actions to disengage the device, changing the configuration from that of FIG. 1 to that of FIG. 2 may, in several embodiments, include overcoming an over-center force. Such a design can impede unwanted disengagement (the safety catch 22, included in some embodiments, further impedes unwanted disengagement). Some examples of an over-center force concept are detailed below in FIGS. 13A-13C and 17A-17C.

FIG. 3 illustrates a perspective view of an example brush and spring for use with several embodiments. The brush spring 24 includes a spring hook 50, a tab 52, and a spring coil 54. The brush 12 includes a brush top 55. The spring coil 54 is shaped and configured to press against the brush top 55. The brush conductor 26 extends around the spring coil 54 and is adapted to couple with a terminal such as the terminal 28 illustrated in FIG. 10. In some embodiments, the brush top 55 may include a coating or dielectric device for preventing current passage through the spring coil 54.

Figure 4C:
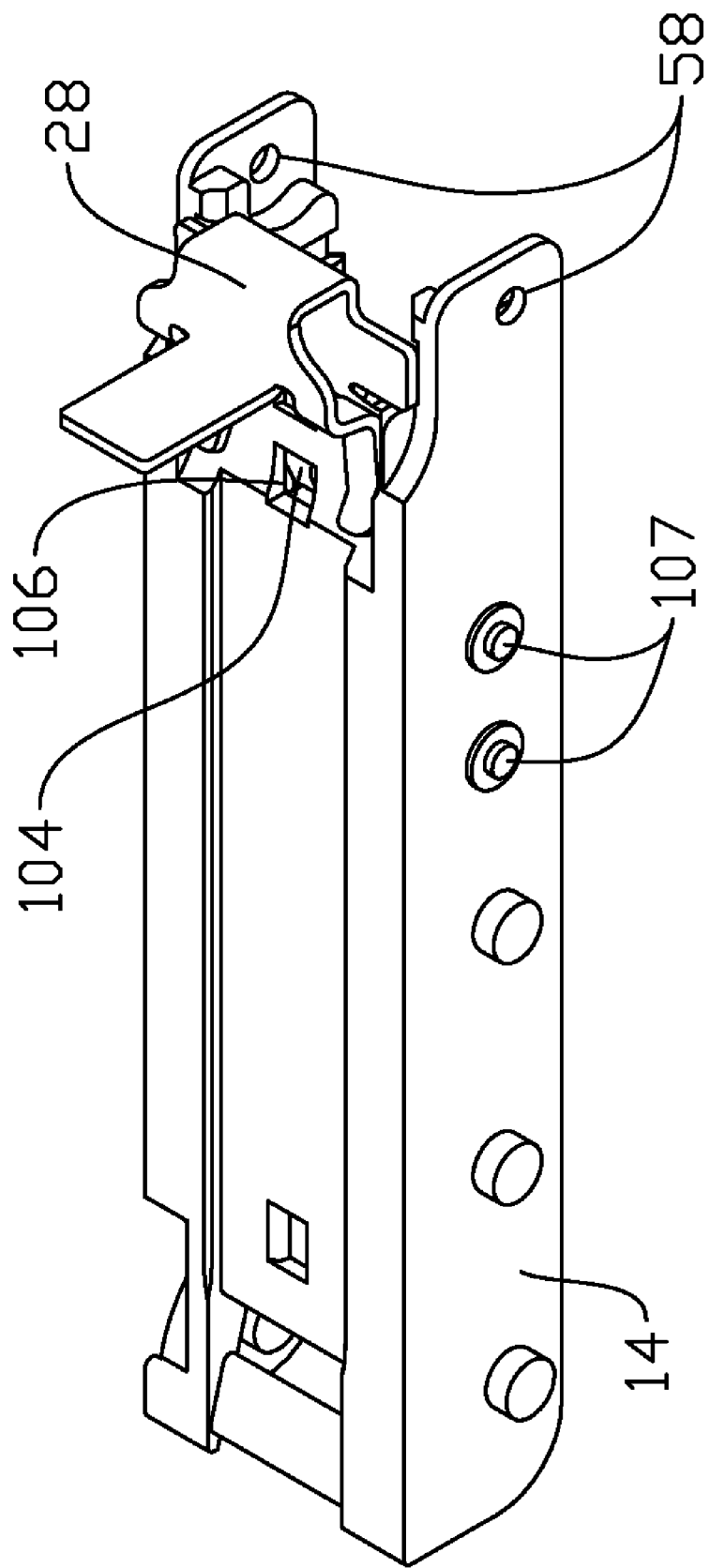
FIG. 4C illustrates a perspective view of an illustrative terminal connecting to an illustrative beam.

FIGS. 4A-4B illustrate perspective views of attachment of a spring similar to that shown in FIG. 3 to an illustrative beam of an example brush holder assembly. FIG. 4A shows a brush spring 24 coupled to a beam 14. The spring hook and tab shown in FIG. 3 are hidden beneath a notch 57 in the beam 14. The spring is shown in an extended, or partially uncoiled configuration, as though engaging a brush, but the brush is not shown so a better view of the spring can be made. FIG. 4A also illustrates the hinge pin holes 58, which provide one location for a pivot line. In the illustrative example shown, the hinge pin holes 58 correspond to pivot line Y shown in FIGS. 1 and 2. The beam 14 includes a brush catch notch 56, which may optionally be included to provide a safety feature further described below with reference to FIGS. 11 and 12. Also shown is a terminal catch 106, which may be used in attaching a terminal to the beam 14, as illustrated in FIG. 4C.

The brush is omitted in FIG. 4A, but it can be seen from viewing both FIG. 3 and FIG. 4A that the brush (FIG. 3) would lie in front of the beam 14 (FIG. 4A), with the spring coil 54 engaging the brush top 55 (FIG. 3), such that the brush 12 (FIG. 3) would extend beyond the bottom end 59 (FIG. 4A) of the beam 14 (FIG. 4A). The spring coil 54 is adapted to allow for continued pressure against the brush top 55 (FIG. 3) as the brush 12 (FIG. 3) wears away during use. Thus the spring coil 54 winds in on itself as the brush top (FIG. 3) moves toward the bottom end 59 (FIG. 4A) of the beam 14 (FIG. 4A).

The notch 57 is sized and shaped to receive the spring hook (not shown) in order to attach the brush spring 24 to the beam 14. By attaching the brush spring 24 to the beam 14, there is no need to supply a back plate to the device, as is often used in other brush holders. Such a construction allows the spring 24 to bias the brush 12 against a conductive surface 13, and allows the brush to slide up and down within the box.

FIG. 4B illustrates a cut-away perspective view of a portion of a beam 14 and brush spring 24 corresponding to an opposite side of that shown in FIG. 4A, focusing primarily on the area of notch 57. The brush spring 54 extends through the notch 57 in a region corresponding to the spring hook 50. The tab 52 extends into an opening 60 on the back side of the beam 14 to secure the brush spring 24 to the beam 14. Other embodiments may utilize other attachment mechanisms. For example, the spring may be provided with one or more holes replacing and in the same general location as the tab, and one or more attachment mechanisms could be placed through the one or more holes to secure the brush spring 24 to the beam 14. The attachment mechanism may be any of a variety of securing mechanisms, for example, a rivet, a bolt, a screw, a sheet metal screw, an adhesive, solder, weld, and/or spot weld, or the like, or other mechanism.

In some embodiments, the attachment mechanism may be an easily removed or detached attachment apparatus, so that the brush spring 24 may be quickly and easily replaced. In other embodiments, the brush spring 24 and attachment mechanism may be more permanent, but may be provided such that the beam 14 is not damaged in removing the brush spring 24 and attachment mechanism. One example of such an embodiment would be to make the beam 14 of a material that does not melt or exhibit plastic deformation until a very high temperature, with the brush spring 24 and attachment mechanism of lower temperature deformation/melting point materials, so that heating in a furnace or by use of a torch could allow ready detachment of the brush spring 24 without damaging the beam 14. In still other embodiments, the brush spring 24 may be permanently attached to the beam 14, and the beam 14 may be reused only a few times until the brush spring 24 is no longer satisfactory for use, at which time the beam 14 with the brush spring 24 may be discarded.

In an alternative embodiment, a brush spring may be provided which, rather than coiling in on itself as the brush spring 24 of FIG. 4A does, will instead extend outward. For example, a spring may be provided to attach to the beam 14 on top of the brush 12, with the spring provided in a compressed state and expanding to push the brush 12 downward. More than one spring may be provided on the same device, too.

Also illustrated in FIG. 4B are several box posts 64. In some embodiments, the box posts 64 are provided as a part of the beam 14 to allow for ready attachment to a box such as the brush box 10 shown in FIGS. 1 and 2. The box posts 64 may allow for removal and cleaning or replacement of a brush box 10 when a new brush 12 is supplied to the brush holder. In other embodiments, the box posts 64 may include threading, pinholes or keyways or the like to allow for a securing apparatus such as a bolt, pin or key to be used in securing the brush box 10. In other embodiments, the box posts, or other such structure, do not allow removal of the brush box. For example, in some embodiments a brush box 10 may be secured to the beam 14 by welding or the like, either with or without the box posts 64.

Figure 14:
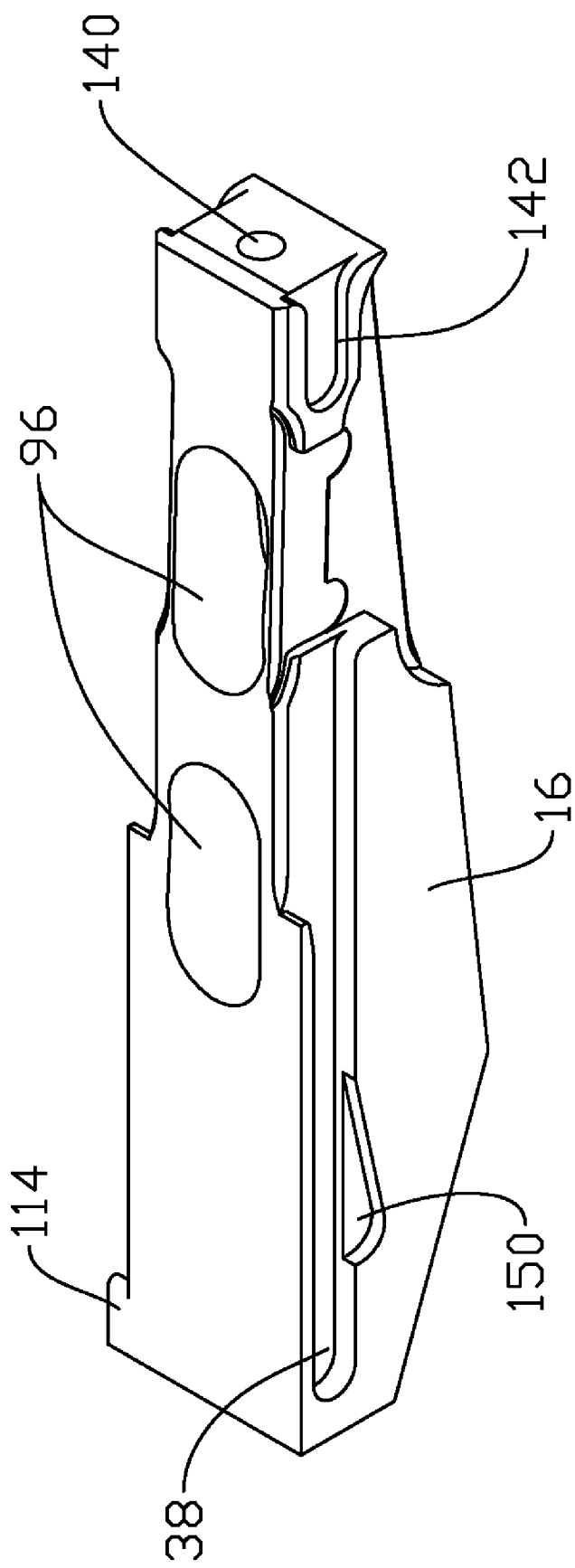
FIG. 14 illustrates a perspective view of a lower mount block for use in several embodiments.

A pivot pin 62 is also shown in FIG. 4B. The pivot pin 62 may provide a pivot line corresponding to pivot X shown in FIGS. 1 and 2. For example, the pivot pin 62 may mate with and slide in a groove 38 as shown in FIGS. 2 and 14. An alignment pin 63 is shown as well. The alignment pin 63 serves to align the lower beam to the lower mount, for example, such that the upper locking pin 192 of a upper beam (shown in FIG. 16B) aligns with the pin gap 186 in the upper mount block 20 (shown in FIG. 15A), as will be discussed in more detail below. The alignment pin 63 is adapted to fit into relief groove 150 shown in FIG. 14.

FIG. 4B illustrates the "channel-like" nature of the example beam 14. The beam 14 is designed so that a lower mount block such as the lower mount block 16 illustrated below in FIG. 14 may be sized and shaped to slide into a channel 68 defined by the beam 14. The channel 68 allows the lower mount block 16 (FIG. 14) to have a regular shape, allowing for several mount holes 96 (FIG. 14) through a solid portion of the lower mount block 16 (FIG. 14) so that secure attachment of the lower mount block 16 is readily performed. Such design also saves space. For example, the mount holes 96 (FIG. 14) can be provided beneath the brush and brush box which attach to the beam 14, rather than being next to or behind these items. This allows for closer brush placement or, in other terms, higher brush density, such that more or additional brush holders can be installed and higher amperage capacity can be achieved, if desired. The compact design also may allow for use of the replaceable brush holder designs in smaller generators and motors.

FIG. 4C illustrates another aspect of the beam 14, this time focusing on the removable attachment of a terminal 28 to the beam 14. As shown, the terminal 28 includes a stop tab 104 which can slide into the terminal catch hole 106. Because a simple stop tab 104 is used to attach the terminal 28, the terminal 28 may be easily removed and replaced whenever desired, or whenever a brush, box, spring or other part is replaced. In some embodiments, the terminal 28 is permanently attached to the brush conductor 26, and therefore, a new terminal is used anytime a new brush is inserted. In other embodiments, the terminal may be releasibly connected to the brush conductor 26, and can be replaced without a new brush, or the brush can be replaced without a new terminal. Because the terminal 28 conducts current, it may be a target for corrosion and accumulation of debris. Also, because the terminal 28 must securely contact a brush conductor 26, it may be advantageous to include a new terminal 28 often. Additionally, in some embodiments, portions of the beam 14 that come in contact with the terminal may be made of, include, or be coated with an insulating material to prevent the flow of current from the terminal to the beam 14. Some examples of insulating material can include plastics, such as Teflon, ceramics, and the like, or other insulating material.

In other embodiments, the brush conductor 26 (not shown) may include an attachment apparatus which attaches to the beam 14 instead of a separate terminal, with the brush conductor 26 (not shown) also including a design allowing it to contact and conduct current to/from a conductor strap (also not shown).

Also illustrated quite clearly in FIG. 4C are two safety catch attachment pins 107, which can be used for attaching a safety catch 22 (FIG. 1) to the beam 14. The safety catch attachment pins 107 may be of any suitable design and material for attaching to safety catch 22 (FIG. 1). The safety catch attachment pins 107, while included in some embodiments, may be excluded in others, since several embodiments also use an over-center force mechanism to maintain the brush assembly in an engaged configuration.

Figure 5:
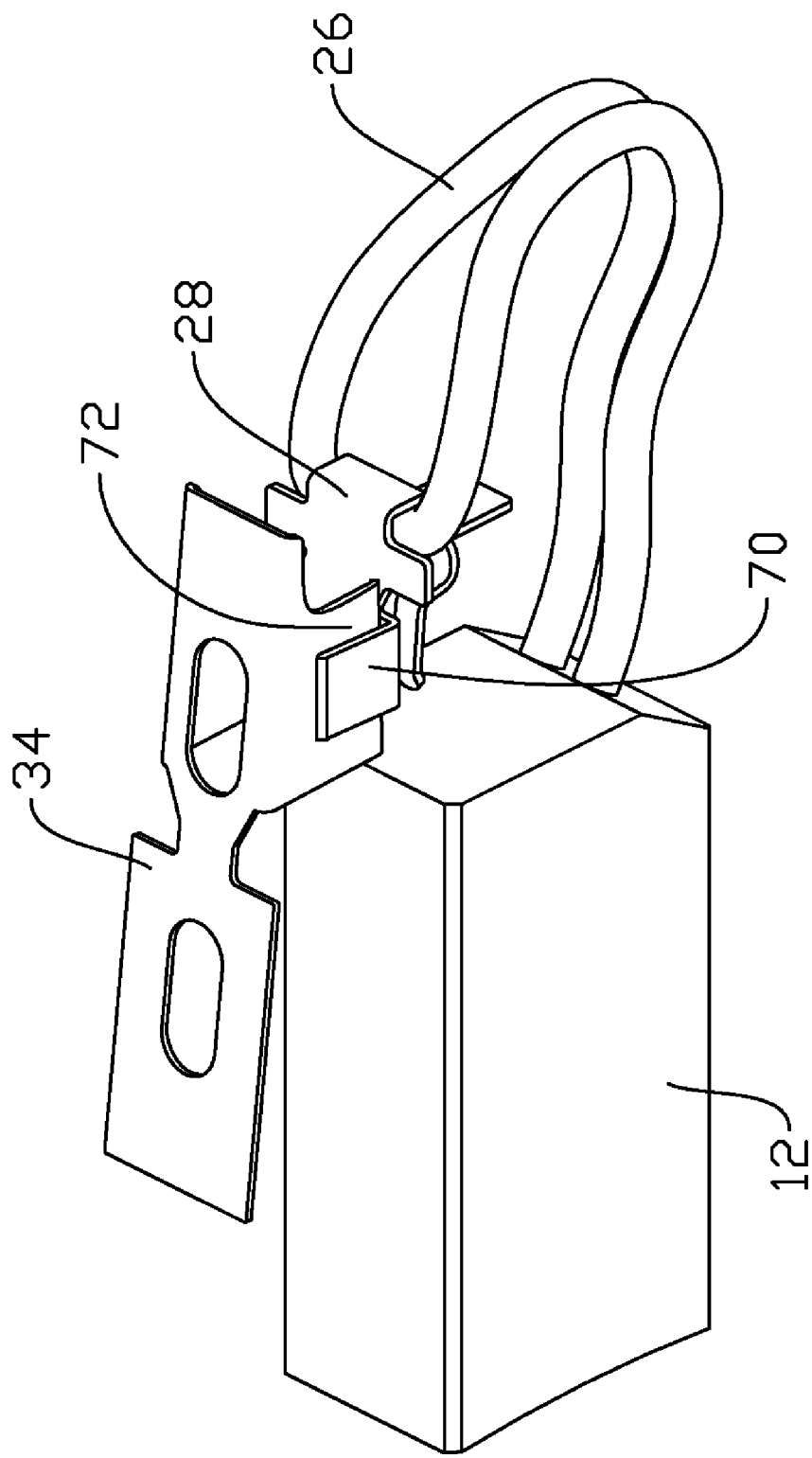
FIG. 5 illustrates a perspective view where several elements of the illustrative embodiment have been omitted to highlight conductive elements as coupled together when an example mounting bracket is in an engaged position relative to a mount block.

FIG. 5 illustrates a perspective view where several elements of the illustrative embodiment have been omitted to highlight a conductive path. Shown are several conductive elements as coupled together when an example mounting bracket is in an engaged position relative to a mount block.

The conductive path includes a brush 12 which, in use, would contact a conductive surface such as a collector ring or a commutator. From the brush 12, current is conducted through a brush conductor 26 to a terminal 28. The terminal 28 includes a terminal leaf 70 that conducts current to a strap leaf 72 of a conductor strap 34. Each element of the conductive path illustrated in FIG. 5 may be made of any of a number of conductive materials including, for example, brass, copper, or silver, but any other conductive material will suffice.

In some embodiments, the terminal 28 and/or the conductor strap 34 can include material or structure adapted or configured to provide a connecting force between the terminal and the conductor strap 34. For example, the terminal 28 and/or the conductor strap 34, or both, can include or be made of a spring material that is configured to bias one or more portions of the terminal 28 and the conductor strap 34 into electrical connection with each other when the mounting bracket is in an engaged position relative to a mount block. For example, in the embodiment shown, the terminal 28 includes two leafs 70 that extend outward from the terminal to provide a generally u-shaped structure. The conductor strap 34 also includes two leafs 72 that form a generally u-shaped structure. The leafs 70, or portions thereof, can be made of or include a portion of which is a spring material, such as a spring polymer, spring metal, for example spring copper or the like. The leafs 70 can be shaped or configured such that at least a portion of the space between the leafs 70 is smaller than the distance between the outer surfaces of the leafs 72 of the conductor strap 34. Due to the shape, and the use of a spring material, when the leafs 70 come into contact with the leafs 72, the leafs 70 are spread apart slightly to engage the leafs 72. However, due to the spring nature of the leafs 70, they bias themselves toward the leafs 72 to provide a connecting force between the terminal and the conductor strap 34. It should be understood that in other embodiments, only one leaf 70 could be used, or more than two leafs 70 could be used, and a similar biasing force can be created. It should also be understood that the leafs 72 of the conductor strap 34 could also be made of a spring material and be adapted or configured to provide an outward biasing force against the leafs of the terminal. In yet other embodiments, the leafs 70 of the terminal could be adapted and configured to fit within the leafs 72 of the conductor strap 34, and to provide an outward biasing force, and/or the leafs 72 of the conductor strap 34 could be adapted and configured to provide an inward biasing force.

Figure 6:
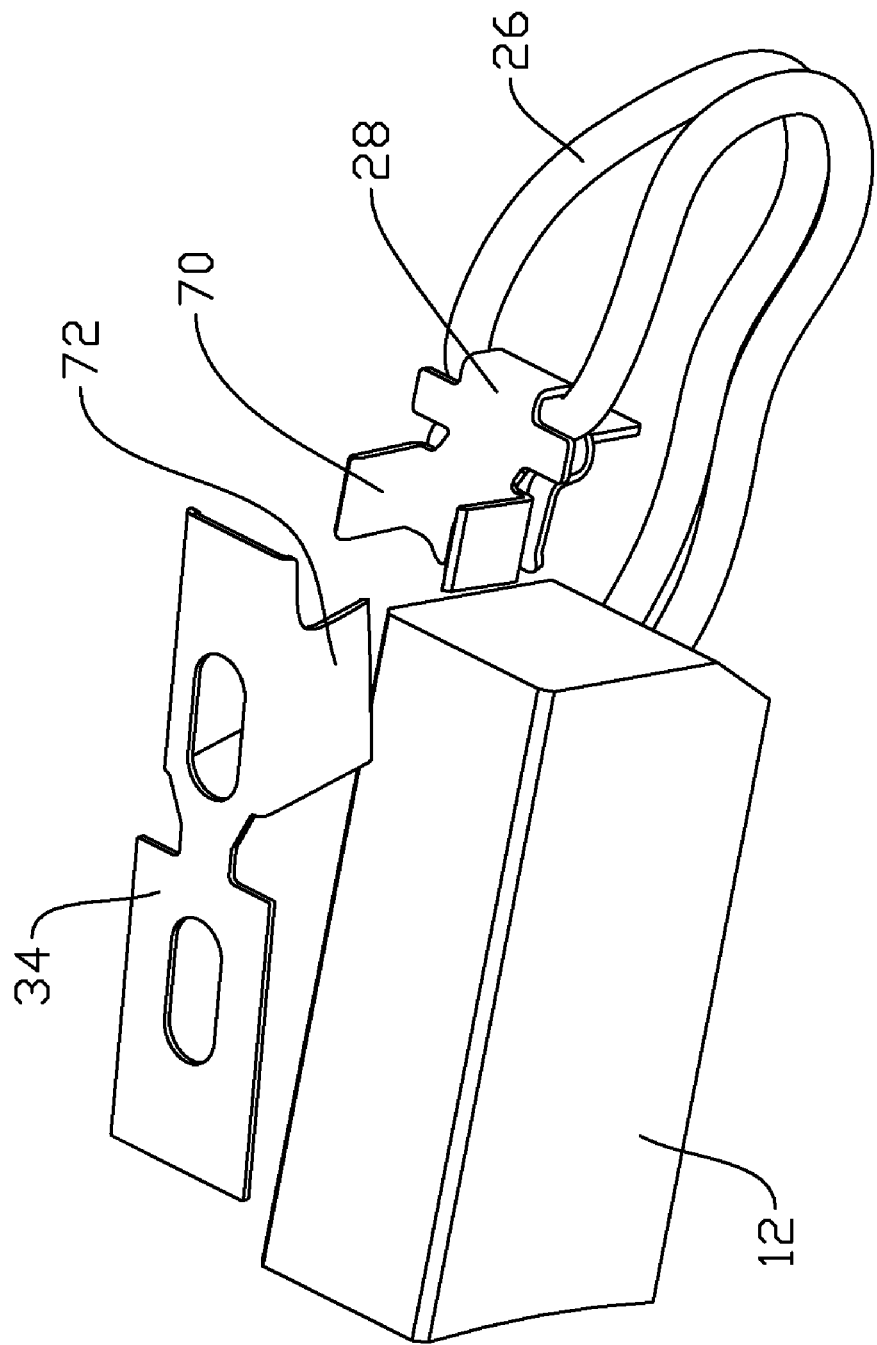
FIG. 6 illustrates a perspective view similar to that of FIG. 5 except that the conductive elements are shown including a disconnection between certain elements because the mounting bracket is in a disengaged position relative to the mount block.

FIG. 6 illustrates a perspective view similar to that of FIG. 5 except that the conductive elements are shown including a disconnection between certain elements because the mounting bracket is in a disengaged position relative to the mount block. As illustrated, the conductive path including the brush 12, brush conductor 26, terminal 28, terminal leaf 70, strap leaf 72 and conductor strap 34 is broken. When disengaged, the terminal leaf 70 does not contact the strap leaf 72. By breaking the conductive path during disengagement, the possibility of arcing between a brush 12 and a commutator or other moving conductive surface during removal or replacement of the brush 12 is reduced. A further safety concern is the possibility of current conduction or shorting during servicing of the brush and/or brush holder. By allowing a first step current disconnection as shown and further illustrated below, the likelihood of current conduction or shorting can be reduced.

In one embodiment, the lock pin 63 (FIG. 4B) forces the beam 14 (FIG. 4B) up as soon as disengagement begins. Then, separation of the terminal leaf 70 from the strap leaf 72 occurs before the brush 12 is separated from an adjacent conductive surface. This combination of movements allows for interruption of current flow before separation between the brush 12 and an adjacent conductive surface, preventing arcing between the brush 12 and the conductive surface. This step is useful because it has been found that such arcing can create a fire hazard and, more often, can create a pit or deformation on a commutator or collector ring surface. Any such pit or deformation will be magnified by further use of the brush 12 on the surface and can require expensive and difficult repairs.

Figure 7:
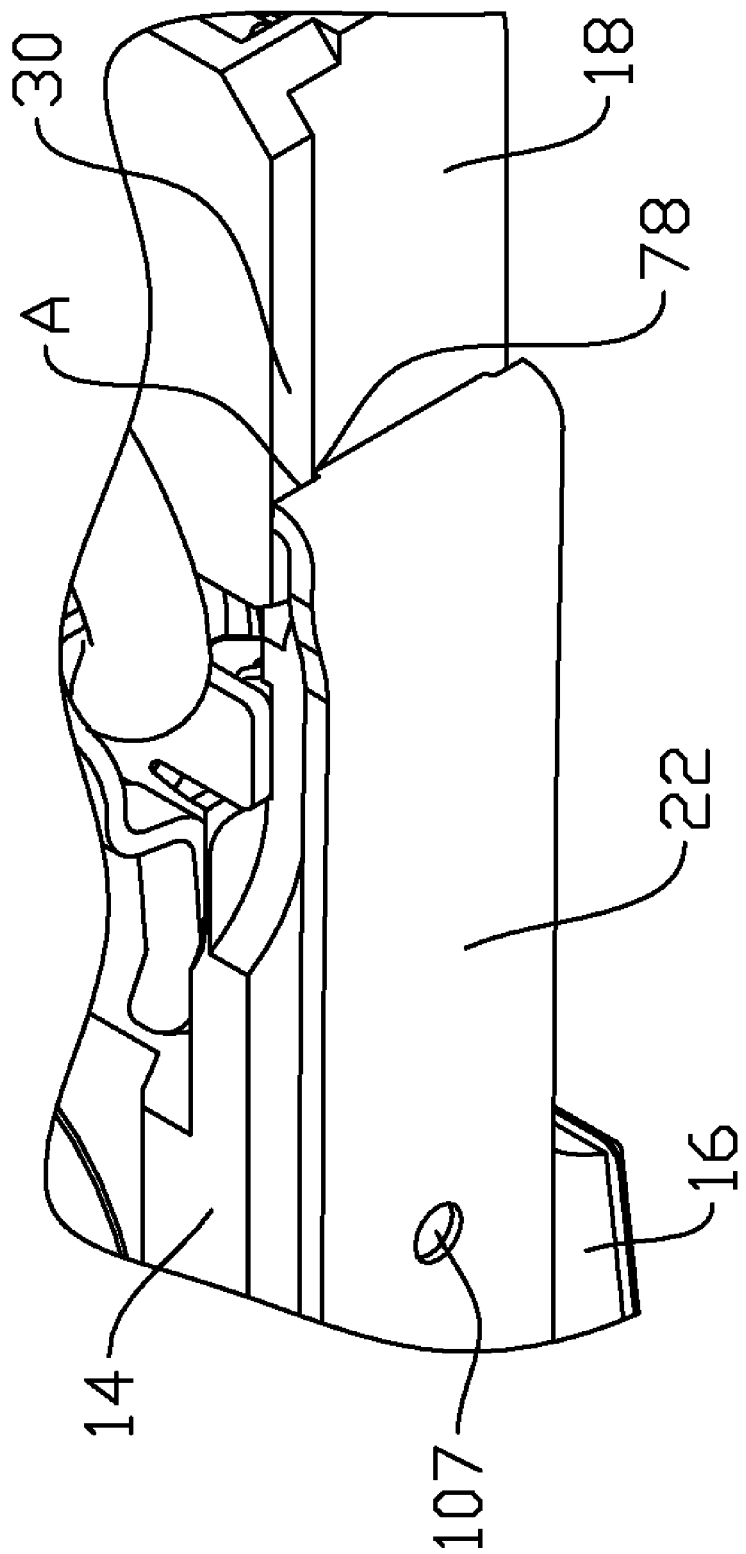
FIG. 7 illustrates a perspective view highlighting a small portion of the perspective view shown in FIG. 2 including a safety locking apparatus.

FIG. 7 illustrates a perspective view showing a portion of the perspective view of FIG. 2 including a safety locking apparatus. A beam 14 is shown with a safety catch 22 attached at a safety catch attachment pin 107. As shown, part of the safety catch 22 engages a ledge 30 of the upper beam 18 at place A. While both the upper beam 18 and the beam 14 will pivot outward when the device is moved to a disengaged position (i.e. a transition from the configuration of FIG. 1 to the configuration of FIG. 2), the beam 14 and safety catch 22 pivot on a greater radius, so that outward movement forces the safety catch 22 against the ledge 30, preventing movement. A removal tool such as that illustrated in FIG. 8A-8B can include a safety catch release which fits through the notch 78 of the safety catch 22, pushing the safety catch 22 away from the upper beam 18 so that the safety catch 22 is cleared of the ledge 30. Once cleared of the ledge 30, the safety catch 22 will not impede a transition from engaged to disengaged configurations.

Figure 8A:
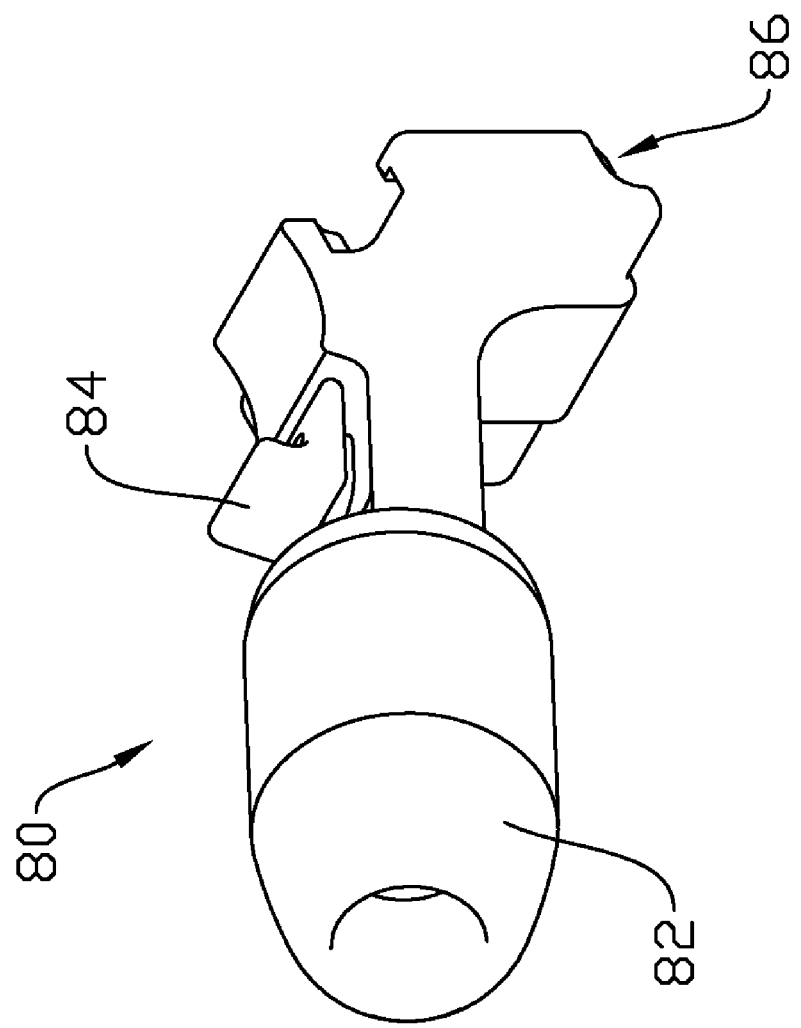
FIGS. 8A-8B illustrate perspective views of a removal apparatus for use with several embodiments.
Figure 8B:
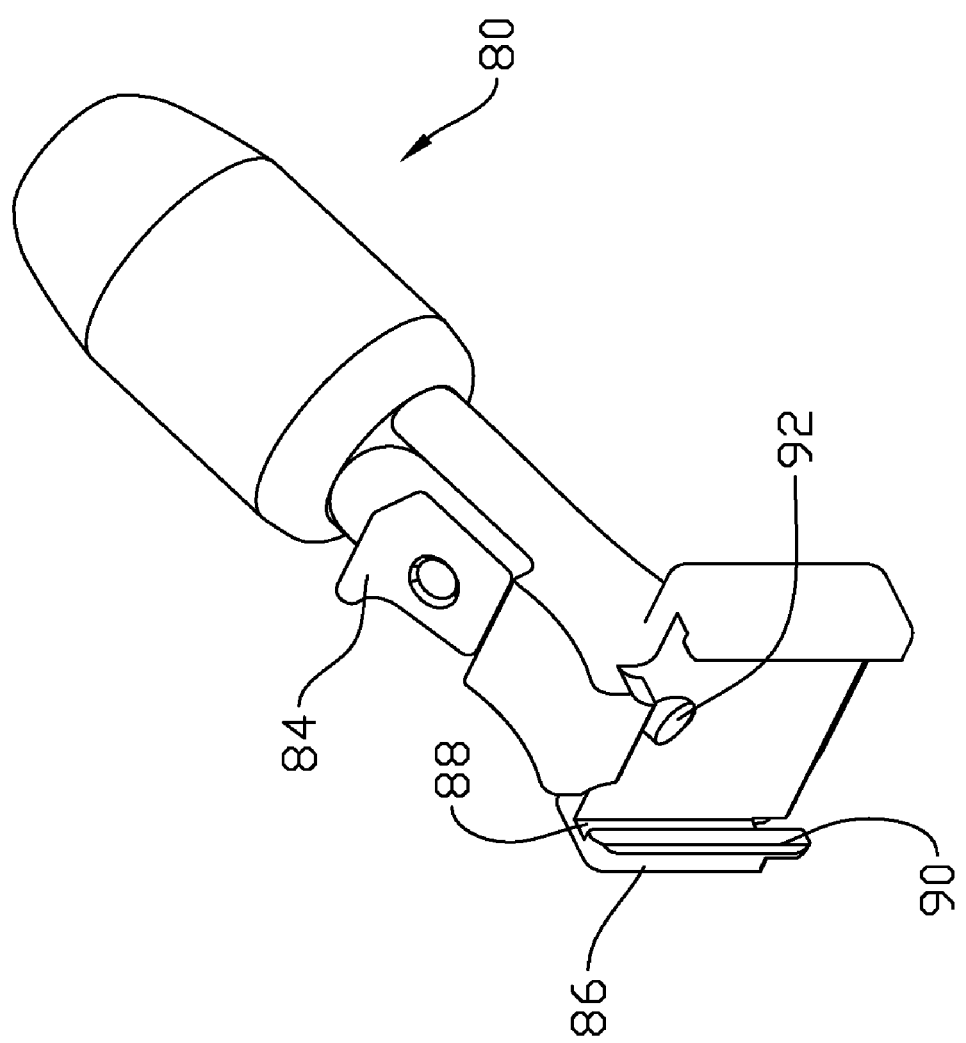

FIGS. 8A-8B illustrate perspective views of a removal apparatus for use with several embodiments. Referring to FIG. 8A, a removal tool 80 includes a handle 82, which may include or be made entirely of an insulator to prevent conduction of electricity to the hand of a worker sent to remove, replace or otherwise service a brush, brush holder, brush spring, brush box, terminal, collector ring, commutator, or conductive surface. While such insulation may be omitted, the likelihood of debris and/or dust creating additional conductive paths throughout a brush holder is possible, so that an additional insulator in the handle 82 may be advisable. Further, such insulation, from the perspective of a worker maintaining the brush holder, may increase confidence.

The removal tool 80 also includes a release tab 84. The release tab 84 may be a spring-loaded device which couples with a spring loaded catch pin 92 (FIG. 8B) that, in turn, can couple with a notch as shown, for example, in FIG. 15B. A safety catch release 86 is also shown, but is better viewed in FIG. 8B.

FIG. 8B illustrates another perspective view of the removal tool 80. The release tab 84 is connected to a catch pin 92 such that, when the release tab 84 is pulled, the catch pin 92 is retracted. Lacking a force on the release tab 84, the catch pin 92 is in a spring-loaded default position, projecting out from the underside of the removal tool 80.

Also illustrated is a safety tab release 86 including a ledge groove 88 and a leading edge 90. Referring now to both FIG. 7 and FIG. 8B, the leading edge 90 (FIG. 8B) is sized and configured to slide past the opening of a notch 78 (FIG. 7) on the safety catch 22 (FIG. 7). The leading edge 90 (FIG. 8B) is aligned with the notch 78 (FIG. 7) by the sliding interaction between the ledge 30 (FIG. 7) and the ledge groove 88 (FIG. 8B). As the leading edge 90 (FIG. 8B) is passed toward the safety catch 22 (FIG. 7) along the surface of the upper beam 18 (FIG. 7), the leading edge 90 (FIG. 8B) encounters and passes through the notch 78 (FIG. 7).

In one embodiment, the leading edge 90 (FIG. 8B) may be shaped or configured so that, as the notch 78 (FIG. 7) is entered and passed, the safety catch 22 (FIG. 7) is forced outward to finally clear the ledge 30 (FIG. 7). Alternatively, the notch 78 (FIG. 7) may be configured so that, as the leading edge 90 (FIG. 8B) passes therethrough, the safety catch 22 (FIG. 7) is forced outward to clear the ledge 30 (FIG. 7). For example, the leading edge 90 (FIG. 8B) and/or the notch 78 (FIG. 7) may include one or more angled or curved surfaces which, when the leading edge 90 (FIG. 8B) passes the notch 78 (FIG. 7), comes into contact with a surface on the other of the leading edge (FIG. 8B) or notch 78 (FIG. 7) and, on further passage, forces the safety catch 22 to bend or curve outward.

FIG. 9 illustrates a perspective view of the interaction between a removal apparatus similar to that of FIGS. 8A and B, with a safety locking apparatus similar to that of FIG. 7 during a disengagement manipulation. As shown, the ledge groove 88 has engaged the ledge 30 (FIG. 7). Meanwhile, the catch pin 92 (FIG. 8B) is engaged with the pin seat 194 (FIG. 16B) of the upper beam 18. Pulling on the release tab 84 (for example, pulling with a thumb) can disengage the catch pin 92 from the pin seat 194. The safety catch release 86 is engaged with the safety catch 22, releasing the safety catch 22 from engagement with the ledge 30 (not shown) on the upper beam 18.

Also shown in FIG. 9, and relevant to description with respect to FIGS. 5 and 6 is a conductive strap 34, which is made of a conductive material. The conductive strap 34 overlies an insulator strap 35, which helps prevent current from flowing throughout the rest of the device, isolating the current carrying material of the conductive strap 34. The conductive strap 34 may be shaped as shown in FIGS. 2, 5 and 6.

FIG. 9 also illustrates several mount holes 96. The mount holes 96 may pass over a mount base on which the lower mount block 16 may be mounted. For example, a pair of threaded bolts may pass through the mount holes 96, with nuts and/or washers placed on the bolts to secure the lower mount block 16 to a mount base. One example of such an embodiment is shown in FIG. 15B. In other embodiments, a welded, keyed, pinned or other attachment scheme may be used to secure the lower mount block 16 to a mount base near a moving conductive surface or in position to move relative to a conductive surface.

Figure 10:
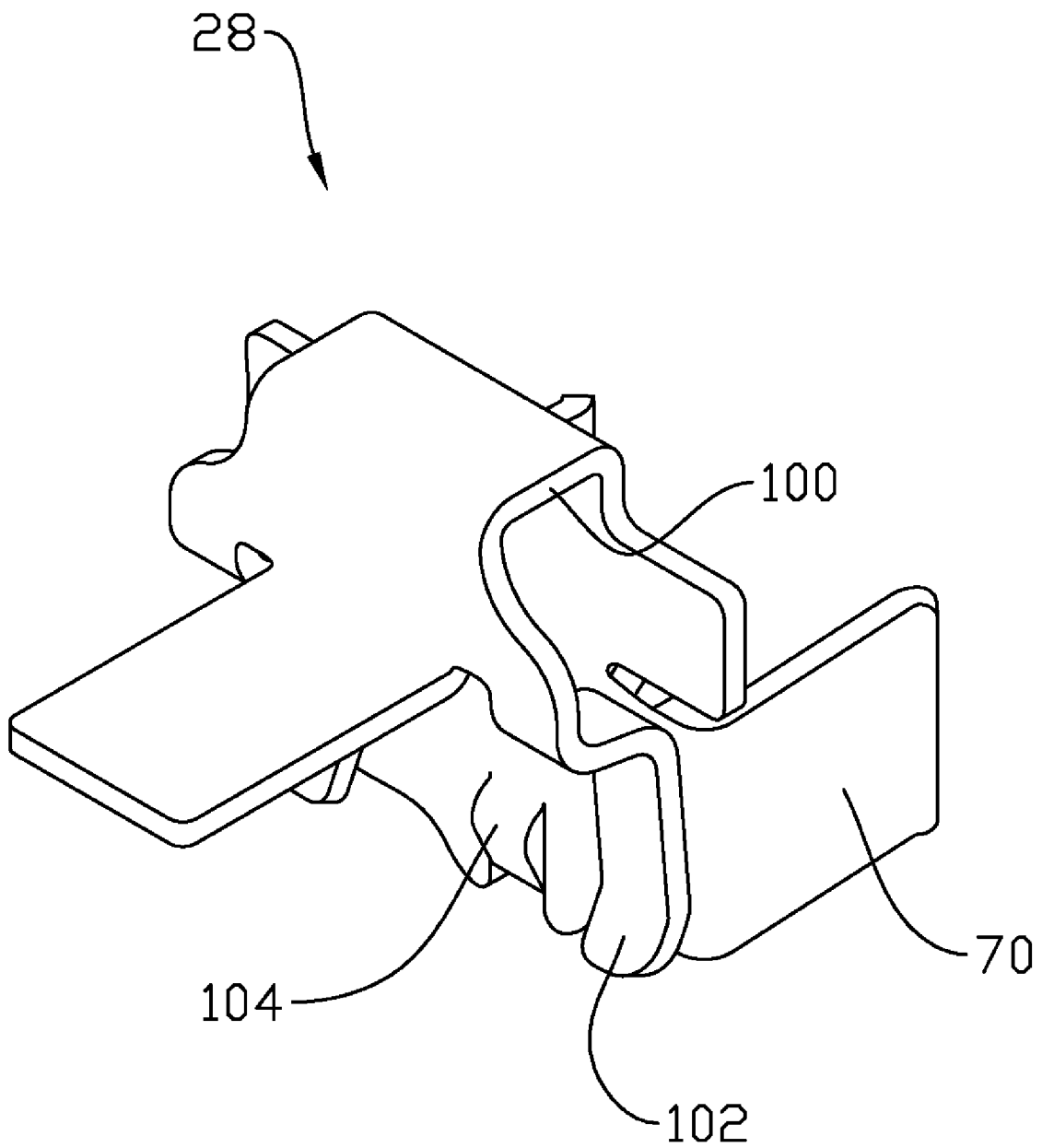
FIG. 10 illustrates a perspective view of a terminal for use in several embodiments.

FIG. 10 illustrates a perspective view of a terminal for use in several embodiments. The terminal 28 includes a conductor receiver 100, stop arm 102, stop tab 104, and terminal leaf 70. The terminal 28 may be formed of a conductive material by any suitable process. In an illustrative example, a piece of sheet metal such as copper may be cut and bent into the illustrated shape.

The terminal 28 is adapted to slide into place on a beam 14. Referring to FIG. 4A, the stop arm 102 may be passed over a top portion of the beam 14 until the stop tab 104 (FIG. 10) reaches the terminal catch 106 (FIG. 4A) and slips into place through the terminal catch 106 (FIG. 4A). Once properly in place, the terminal leaf 70 will extend down to a lower side of the beam 14 as diagrammed in FIGS. 5 and 6. When the device is in an engaged configuration, the terminal leaf 70 contacts the conductive strap 34 (FIG. 9). As a result of the slip-on nature of the terminal 28, it may be replaced as needed, without requiring that the beam or other parts of the brush holder be discarded. Further, the slip-on or snap-type terminal 28 used in several embodiments does not require additional welds or screws for attachment, simplifying both replacement and removal of the terminal 28.

The conductor receiver 100 may be sized or otherwise adapted to provide good contact with a brush conductor 26 (FIG. 3). For example, the inside sizing of the conductor receiver 100 may be such as to apply compression to a brush conductor 26 (FIG. 3). In additional embodiments, a set screw, compression screw, soldering location, winding post, snap-down piece, spring, or other apparatus may be included to augment or replace the conductor receiver 100 and improve or more strongly secure contact with the brush conductor 26 (FIG. 3).

Figure 11:
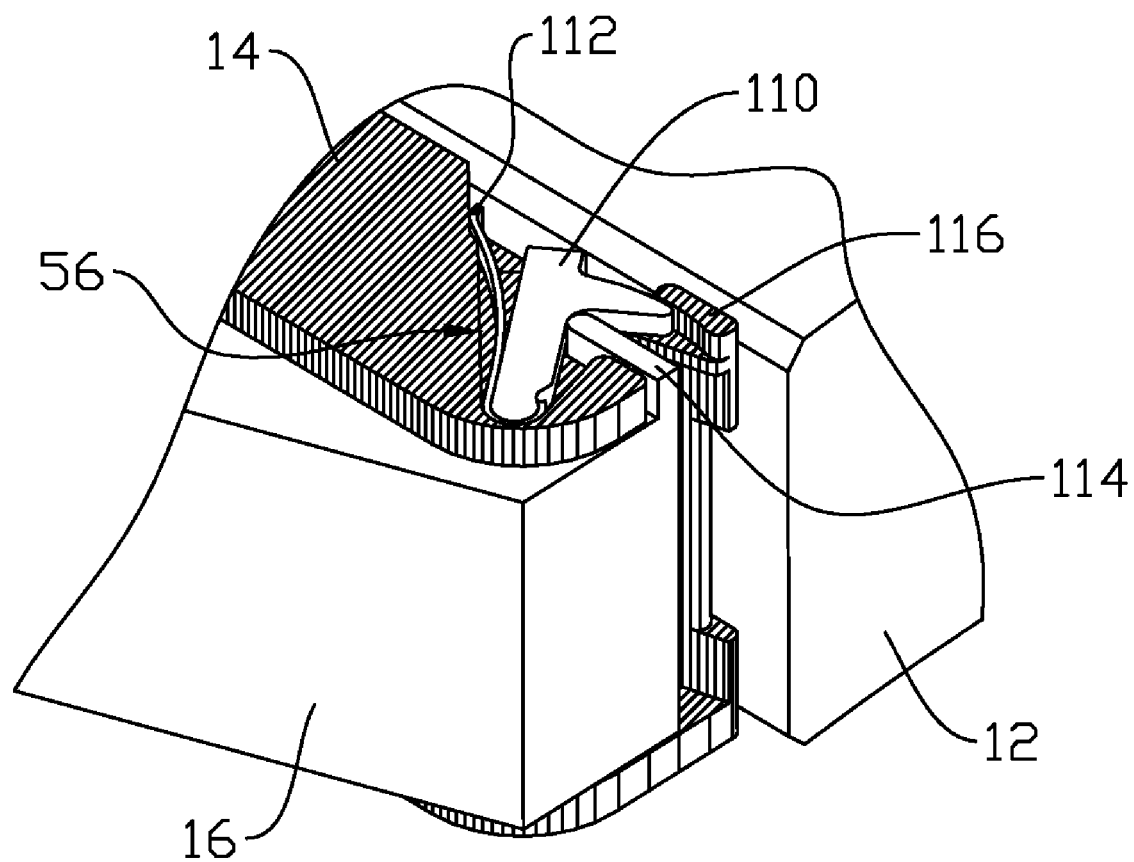
FIG. 11 illustrates a cut-away view of an illustrative brush-catch mechanism used in some embodiments, with the brush-catch mechanism retracted.

FIG. 11 illustrates a cut-away view of an illustrative brush-catch mechanism used in some embodiments, with the brush-catch mechanism retracted. As shown, a beam 14 is engaged with respect to a lower mount block 16. The surface of the beam 14 is shown with lines included to further illustrate features including a guide tab 116 and a brush catch notch 56. A brush box, which would otherwise conceal the brush catch notch 56, has been cut-away to expose the brush catch mechanisms.

A brush catch 110 is engaged with a brush catch spring 112 in the brush catch notch 56. A brush release tab 114 is a part of the lower mount block 16. The brush release tab 114 may be created or attached by any suitable method. The guide tab 116 is a part of the beam 14 as further illustrated, for example, in FIG. 4A. While the beam 14 and the lower mount block 16 are in the engaged configuration (i.e. the configuration shown in FIGS. 1 and 11), the brush release tab 114 presses against the brush catch 110 to prevent the brush catch 110 from extending above the guide tab 116 and engaging the brush 12.

Figure 12:
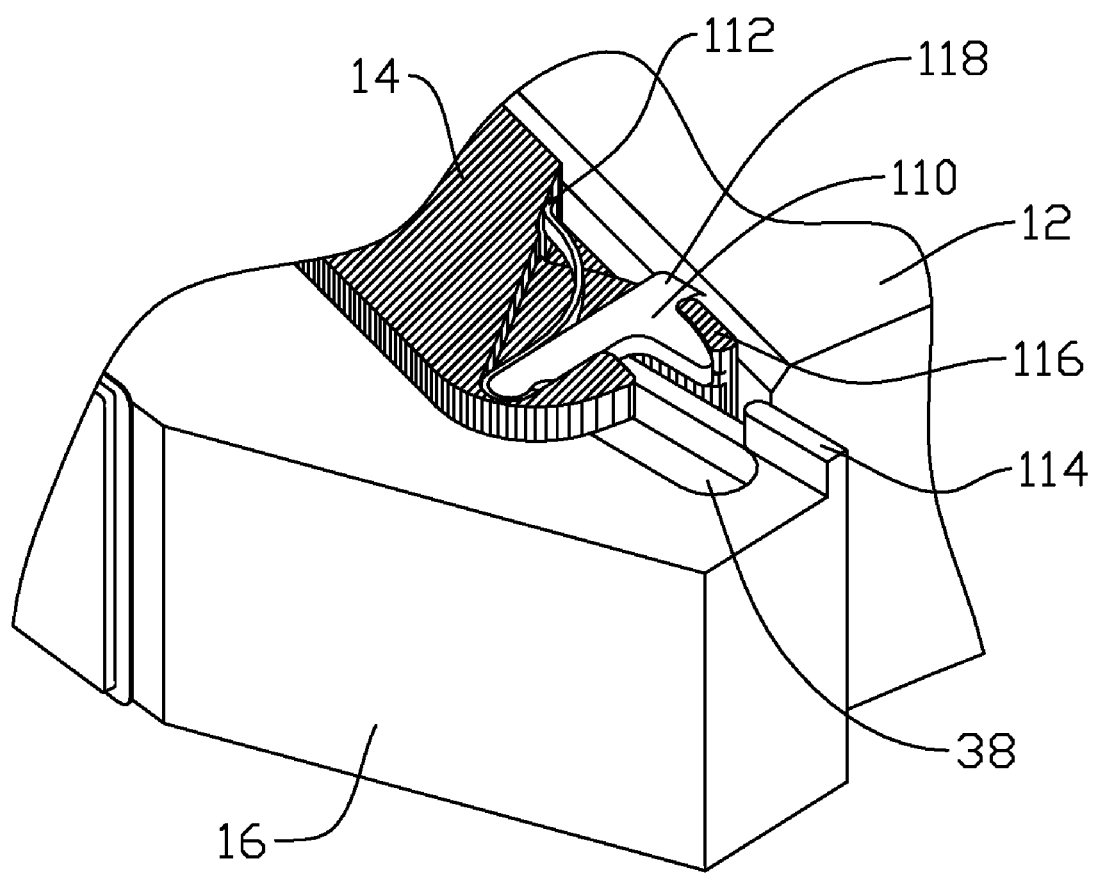
FIG. 12 illustrates extension of a brush-catch mechanism similar to that shown in FIG. 11 to engage a brush.

FIG. 12 illustrates extension of a brush-catch mechanism similar to that shown in FIG. 11 to engage a brush during retraction of the beam with respect to the lower mount block. As shown in FIG. 12, the beam 14 and lower block mount 16 have been disengaged (i.e. the configuration shown in FIG. 2). Once disengaged, the beam 14 may be retracted with respect to the lower mount block 16, revealing a groove 38. During the retraction, the brush catch 110 moves away from the brush release tab 114, allowing the brush catch spring 112 to press the brush catch 110 to an extended position, so that the upper end 118 of the brush catch 110 engages the brush 12, preventing the brush 12 from moving downward. The guide tab 116 also stops the brush catch 110 at a most-extended position, holding the brush catch 110 engaged with the brush 12 until a force is applied to the brush catch 110 to release the brush 12. For example, after withdrawal of the beam 14 with the brush 12, a technician may use a screwdriver or other tool to press against the brush catch 110, retracting the brush catch 110 and releasing the brush 12.

In other embodiments, other brush catch mechanisms may also be used to prevent the brush 12 from falling out of the bottom of the brush box 10. For example, referring to FIG. 1, the brush conductor 26 may be sized and shaped so that the top end of the brush 12 cannot pass beyond the bottom of the box 10 when the brush conductor 26 is coupled to the terminal 28. In another example, referring now to FIG. 3, a loop attached to the brush top 55 may pass through the spring coil 54 (the loop may be tied or clipped into place), with the spring coil 54 pushing on the brush 12 until the spring coil 54 reaches the spring hook 50, the loop then holding the brush 12 in place and preventing further movement forward.

Figure 13A:
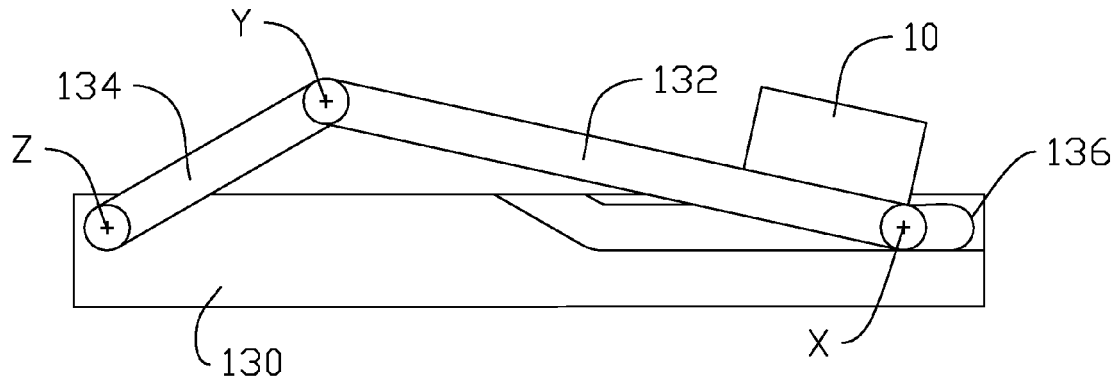
FIGS. 13A-13C illustrate highly schematic views highlighting the over-center locking mechanism used in several embodiments.
Figure 13B:
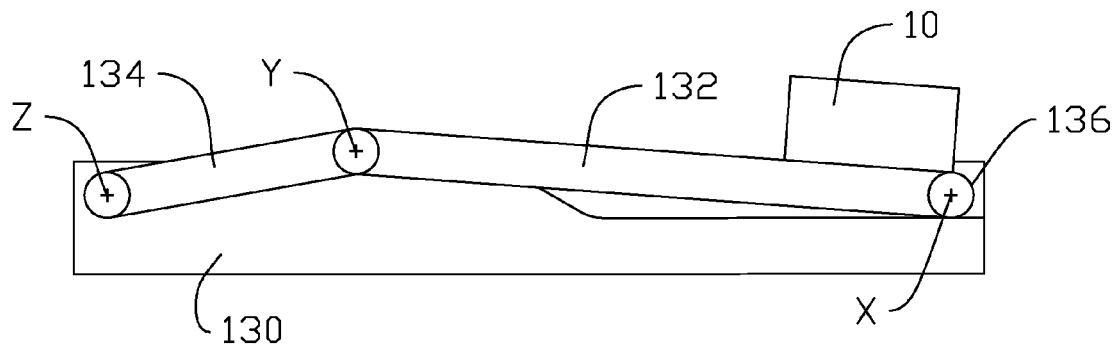
Figure 13C:
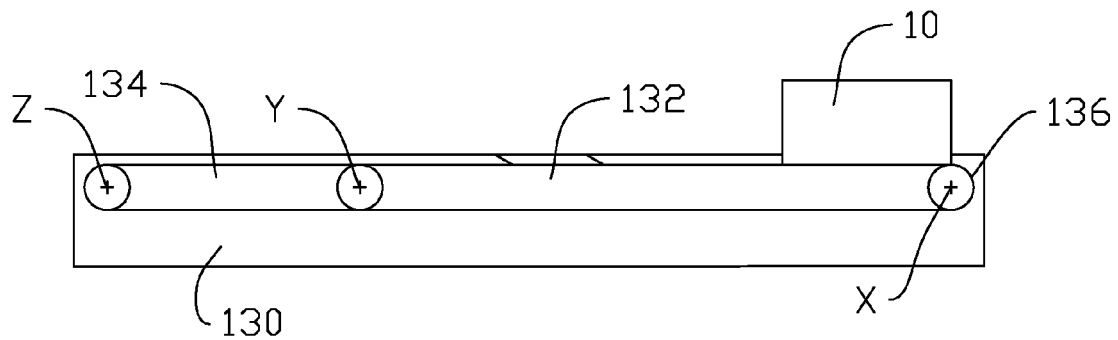

FIGS. 13A-13C illustrate highly schematic views highlighting an over-center locking mechanism used in several embodiments. FIG. 13A illustrates a brush holder including a brush box 10, a lower mount 130, beam 132, a removal receiver 134, and a groove 136. Hinge locations X, Y, and Z are also shown, hinge X including a pin which may slide with respect to the lower mount 130 in the groove 136 but which is fixed at one end of the beam 132 (for example, hinge pin 62 shown in FIG. 4B, which may slide in groove 38 shown in FIG. 2). Hinge Y is a hinge between the beam 132 and the removal receiver 134, while hinge Z is a hinge between the removal receiver 134 and the lower mount 130. The configuration in FIG. 13A is fully disengaged, with the brush box 10 tilted and pulled away from the bottom end of the lower mount 130.

FIG. 13B illustrates an intermediate stage of a movement from the disengaged configuration of FIG. 13A to the engaged configuration shown in FIG. 13C. At this intermediate stage, the slidable hinge X has slid to the end of the groove 136 near the bottom of the lower mount 130. The hinge Y has not completely straightened out to reach a 180 degree configuration, but both ends of the jointed member including the beam 132 and removal receiver 134 are now fixed. Therefore, an additional "over center" force must be applied to force the beam 132 and removal receiver 134 into the configuration shown in FIG. 13C.

As shown in FIG. 13C, the beam 132 and removal receiver 134 are now in a straight configuration and the device is completely engaged. In this engagement, there will be tension between stretching forces along the length of the lower mount 130 applied by the beam 132 and removal receiver 134 and compressive forces on the beam 132 and removal receiver 134 applied by the lower mount 130, due to the over center force noted with respect to FIG. 13B. In effect, the configuration of FIG. 13C is reached by jamming or forcing the components from the configuration of FIG. 13B to that of FIG. 13C. This over center force also acts to keep the pieces engaged as shown in FIG. 13C, and inclusion of a safety latch device as illustrated in FIG. 7.

For some embodiments, when the hinge Y is in the configuration as shown in FIG. 13B, the conductive elements of the brush holder may be separated to prevent current flow, as more completely shown in FIGS. 5 and 6. Note that the brush box 10, however, in FIG. 13B, remains nearly to the bottom of the beam 130 and is in almost the same position as that shown in FIG. 13C, where the brush holder is engaged and current is flowing. As such, the current may be stopped without a brush in the brush box 10 being disengaged from an adjacent commutator, preventing commutator damage due to arcing during removal.

FIG. 14 illustrates a perspective view of a lower mount block for use in several embodiments. The lower mount block 16 includes a groove 38 into which a pin or pins from a beam may be placed. A relief groove 150 is included for the alignment pin 63 of the beam, and can improve the stability and direction of both insertion and withdrawal. For the example lower mount block 16, the relief groove 150 is more shallow than the groove 38, so that, for example, a shorter alignment pin 63 may engage either groove 38, 150 while a longer primary pin may engage only the deeper groove 38. The alignment pin 63 can also serve to align the lower beam to the lower mount, for example, such that the upper locking pin 192 of a upper beam (shown in FIG. 16B) aligns with the pin gap 186 in the upper mount block 20 (shown in FIG. 15A), as will be discussed in more detail below. A brush release tab 114 is also shown, and may function in accordance with the description of FIGS. 11 and 12. Several mount holes 96 may include threading or other elements that allow for attachment to a mount base.

The lower mount block 16 may include a fork seat 142 for receiving a fork of an upper mount block such as the upper mount block 20 as shown in FIG. 15. The fork seat 142 provides stability to the upper mount block. The upper mount attachment hole 140 allows for securing the upper mount block to the lower mount block, for example, by welding or by using a threaded screw or bolt, or other attachment mechanism. The upper mount block is shown in FIG. 15A including a bore for placing a bolt into the attachment hole 140.

The lower mount block 16 may be mounted on any number of surfaces. Of particular use may be the fact that lower mount block 16 can be mounted onto a flat surface. This means that the lower mount block 16 can be retrofitted onto existing brush riggings. For example, an existing rigging may include a number of bolts and other elements, which may be removed and/or cut off of the existing rigging, leaving behind a flat surface. The lower mount block 16 may then be mounted onto the remaining flat surface by, for example, welding it into place. Alternatively, any remaining flat surface may be fitted with two bolts, properly placed, to which the lower mount block 16 may be attached. Because the present embodiment can be separated into multiple pieces, with the lower mount block 16 being the only portion that must be "fixed" to a location, attachment steps are simplified, because other parts can be set aside until the lower mount block 16 is placed and secured.

FIG. 15A illustrates an upper mount block 20 which can be attached to the lower mount block illustrated in FIG. 14. The upper mount block 20 includes a fork 36 which can enter the fork seat 142 of the lower mount block 16 shown in FIG. 14. Also illustrated is the counterbored attachment hole 182, which may be aligned with the attachment hole 140 of the lower mount block 16 of FIG. 14. An upper locking pin hole 184 and pin gap 186 are adapted and shaped to function with upper locking pin 192 of a upper beam such as that shown in FIG. 16B. The pin gap 186 allows complete removal of the upper beam from the upper mount block, as the upper locking pin 192 (FIGS. 16A and B) is shaped and sized to pass through the pin gap 186. The alignment pin 63 (FIG. 4B) can engage the groove 38 and serve to align the lower beam to the lower mount, for example, such that the upper locking pin 192 of a upper beam (shown in FIGS. 16A and B) aligns with the pin gap 186 in the upper mount block 20 (shown in FIG. 15A).

FIG. 15B illustrates an exploded view of how the upper mount block 20 of FIG. 15A can be attached to the lower mount block 16 of FIG. 14. A threaded bolt 183, or other such attachment mechanism, can be inserted through the attachment hole 182 in the upper mount block 20, and is aligned with and extends into and engages the attachment hole 140 of the lower mount block 16. The attachment hole 140 can include internal threads that engage the threaded bolt 183, and the bolt can be tightened down to connect the upper mount block 20 to the lower mount block 16. In some embodiments, additional structures 185, such as one or more Belleville washers, disc springs, or the like, can be disposed about the bolt 183 between the upper mount block 20 and the lower mount block 16 to provide a degree of separation force between the upper mount block 20 and the lower mount block 16. In some such embodiments, adjustment to the overall length of the upper mount block 20 and the lower mount block 16 when they are connected together can be made. For example, the bolt 183 may be loosened such that the structure 185 applies a separation force between the upper mount block 20 and the lower mount block 16 such that the overall length of the upper mount block 20 and the lower mount block 16 when they are connected is longer. Alternatively, the bolt may be tightened to compress the structure 185, and thereby shorten the overall length of the upper mount block 20 and the lower mount block 16 when they are connected. Such adjustment may allow for a customized fit with beam 14 and upper beam 18, and may allow for the adjustment of force needed to put the mount in an engaged position.

In some other embodiments, additional structures 185, such as one or more Belleville washers, disc springs, or the like, can be disposed about the bolt 183 between the upper mount block 20 and the head of the bolt 183 to provide a degree of separation force between the upper mount block 20 and the bolt head. The bolt can then be tightened down against the additional structures 185, such as Belleville washers, disc springs, or the like, such that the additional structures 185 provide a predetermined level of force against the upper mount block 20. In such embodiments, when the additional "over center" force is applied to force the holder into an engaged position (for example, the beam 132 and removal receiver 134 into the configuration shown in FIG. 13C) the stretching forces along the length of the upper and lower mount blocks 16 and 20 and compressive forces on the beam 14 and upper beam 18 can be somewhat absorbed by the additional structures 185. For example, some embodiments may include a stack of Belville washers, for example, in the range of about 1 to 8, or more Belville washers disposed between the upper mount block 20 and the head of the bolt to provide an automatic or controlled tensioning force. In some embodiments, the controlled force can be in the range of about 100 to about 400 pounds.

FIG. 15B also illustrates one embodiment of how the mount holes 96 may pass over a mount base 41 on which the lower mount block 16 may be mounted. For example, a pair of threaded bolts 43 may pass through the mount holes 96, with nuts 45 and/or washers placed on the bolts 43 to secure the lower mount block 16 to a mount base. As indicated above, in other embodiments, a welded, keyed, pinned or other attachment scheme may be used to secure the lower mount block 16 to a mount base near a moving conductive surface or in position to move relative to a conductive surface. The bolts 43, nuts 45, or other such structure may include, be coated with, or be made of an insulative material to help prevent current passing via the brush 12 from passing through the lower mount block 16.

Figure 16A:
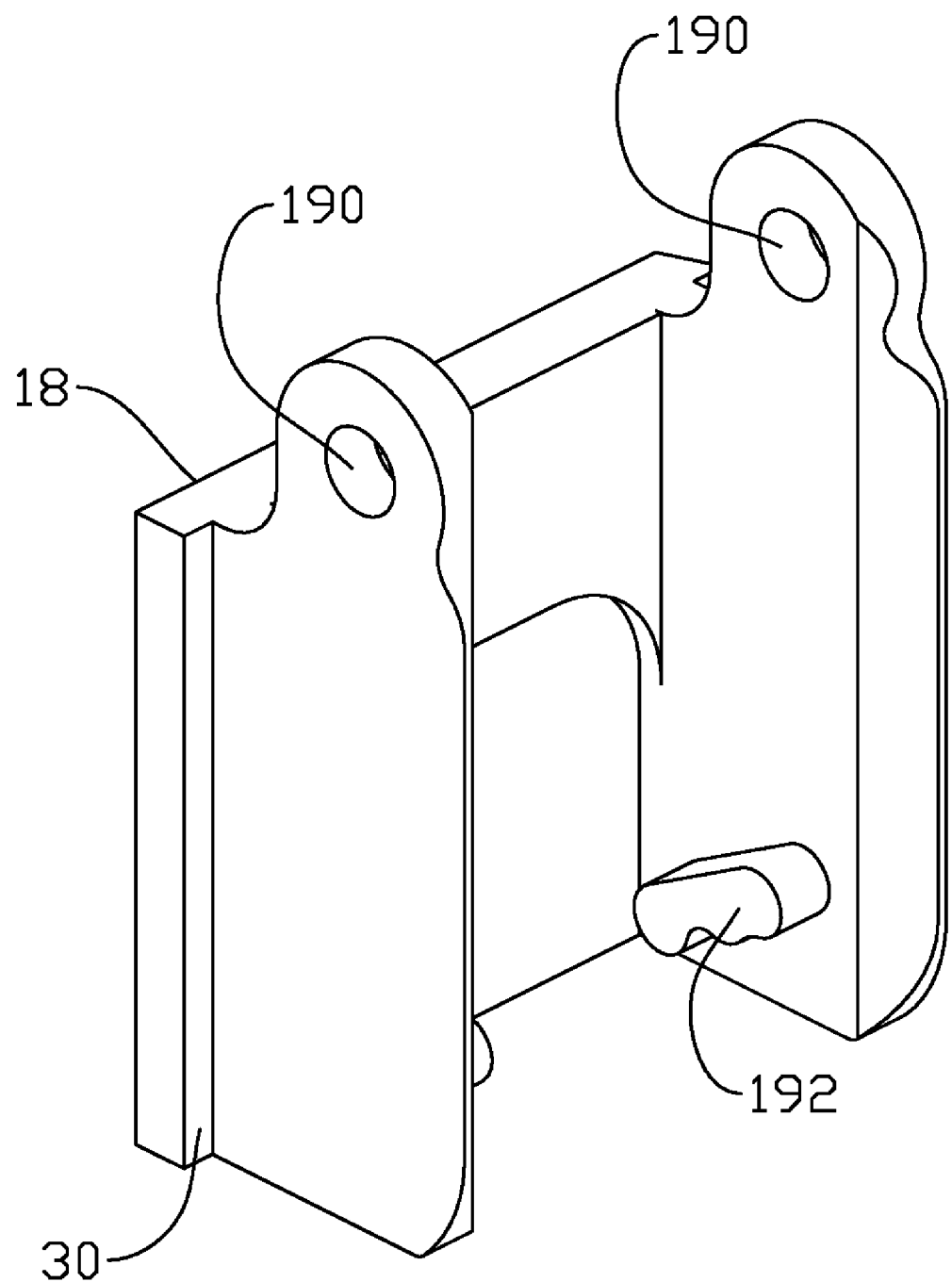
FIGS. 16A-16B illustrate perspective views of a upper beam which can mate with a removal tool as in FIG. 8.
Figure 16B:
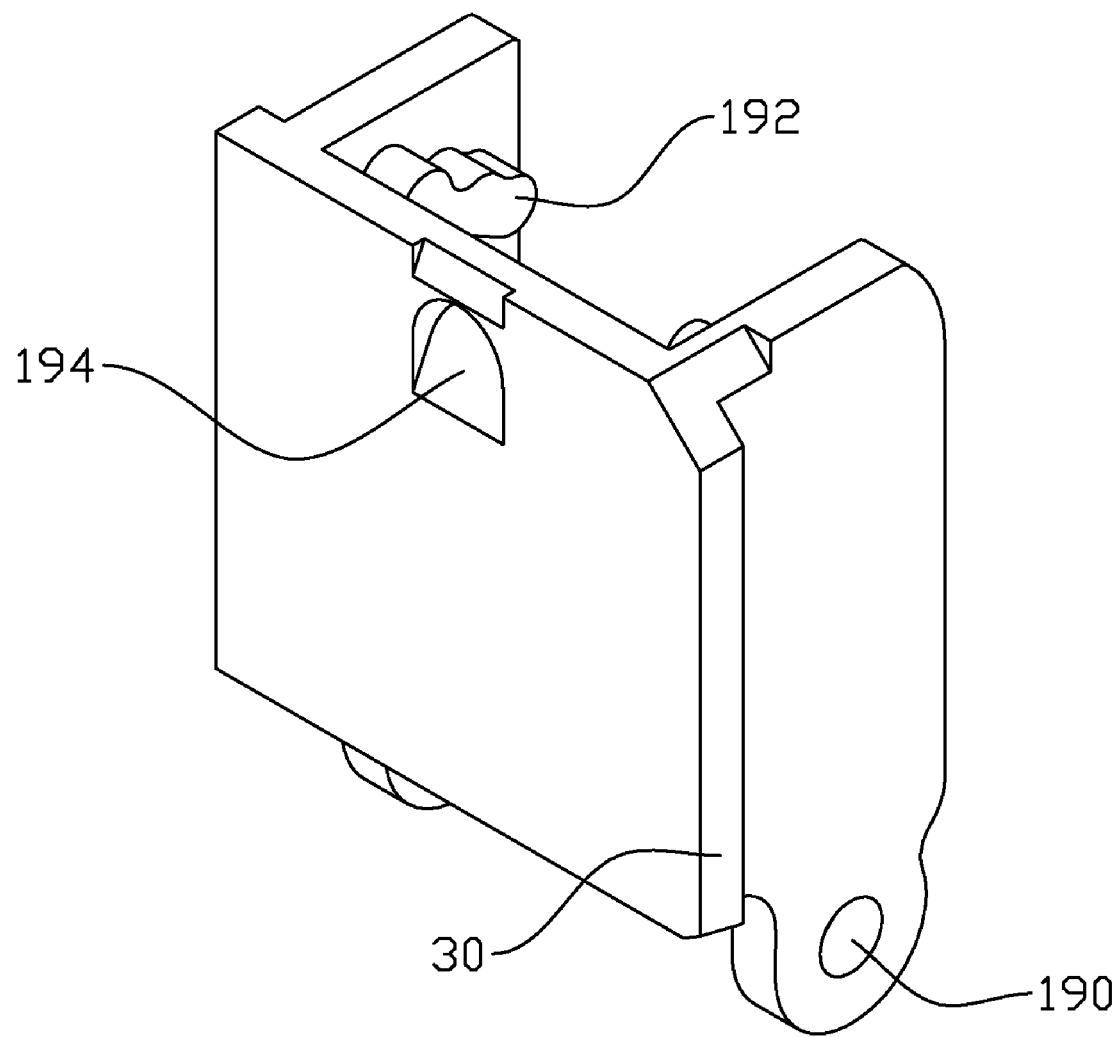

FIGS. 16A-16B illustrate perspective views of a upper beam which couples to a removal tool as in FIG. 8. Referring to FIG. 16A, the upper beam 18 may include a ledge 30, a hinge pin hole 190, and an upper locking pin 192. The hinge pin hole 190 may be included to correspond to pivot line Y illustrated in FIGS. 1 and 2. The pivot line Y therefore pivots between a hinge pin hole 190 of the upper beam 18 and a hinge pin hole 58 on the beam 14 shown in FIG. 4A. Ledge 30, as discussed above, performs the function of providing a location for the removal tool of FIGS. 8A-8B to "grasp" the upper beam 18 as well as providing a location against which the safety catch 22 can press to prevent removal without the proper removal tool.

FIG. 16B provides an additional perspective view of the upper beam 18, again showing the upper locking pin 192, ledge 30 and hinge pin hole 190. Also highlighted is a pin seat 194. The pin seat 194 is designed so that the catch pin 92 of the removal tool 80 shown in FIG. 8B can be inserted therein. Once inserted, the catch pin 92 (FIG. 8B) locks the removal tool 80 (FIG. 8B) to the upper beam 18 (FIG. 16B), until the release tab 84 (FIG. 8B) is moved to pull the catch pin 92 (FIG. 8B) out of the pin seat 194 (FIG. 16B).

Figure 17A:
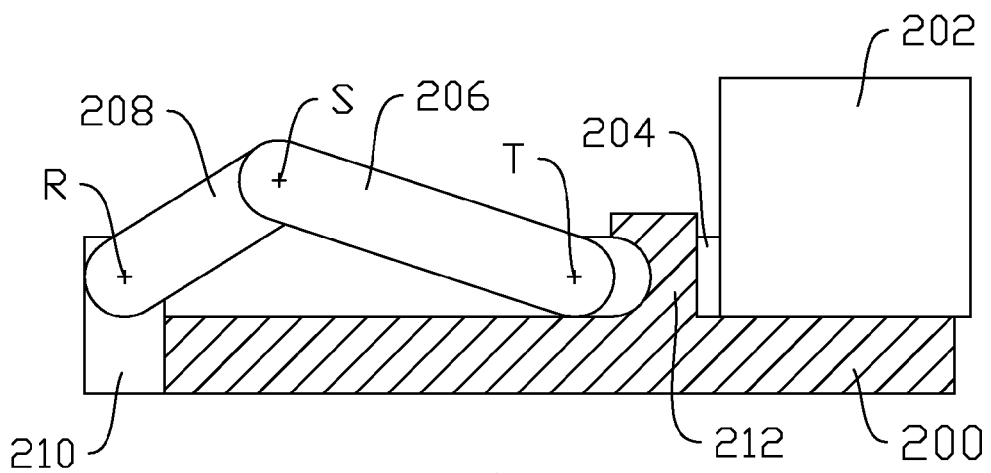
FIGS. 17A-17C illustrate highly schematic views of an alternative over-center design in which the brush does not tip.
Figure 17B:
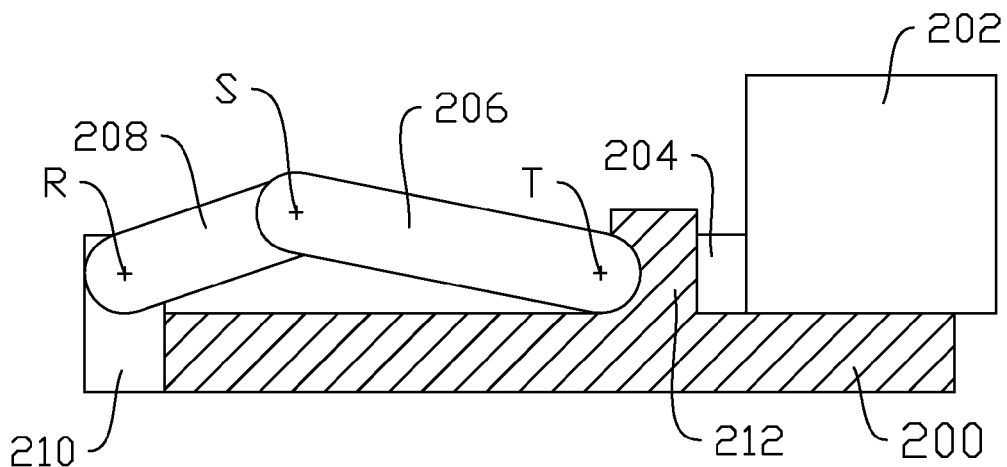
Figure 17C:
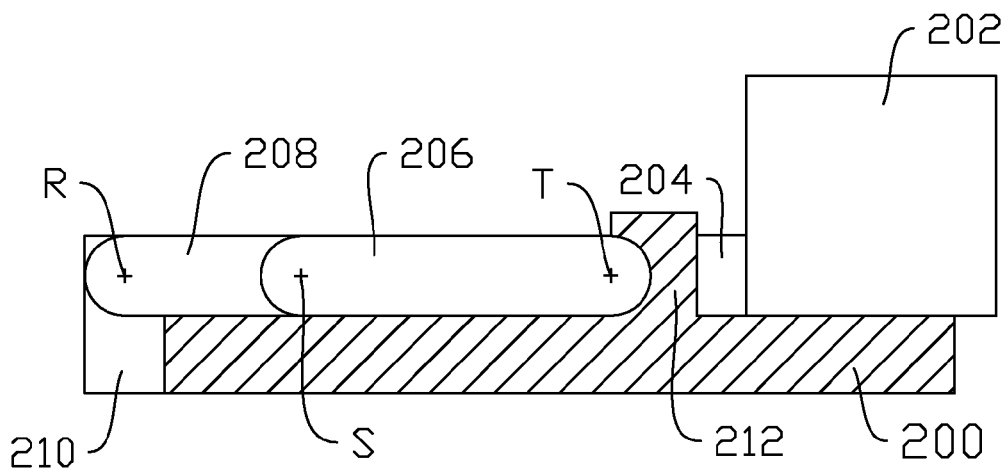

FIGS. 17A-17C illustrate highly schematic views of an alternative over-center design in which the brush does not tip. The illustrative embodiment includes a lower mount 200 on which a brush 202 connected to slide 204 may be mounted. The brush 202 may be slidingly mounted on the slide 204. For example, the slide 204 or the brush 202 may include a spring or other mechanism to push the brush forward against an adjacent commutator (not shown). A beam 206 connects with slide 204 at hinge T. A removal receiver 208 connects with the beam 206 at hinge S. The removal receiver 208 may be adapted to receive a handle or removal tool such as the removal tool shown in FIGS. 8A-8B. The removal receiver in turn connects to a rear mount 210 at hinge R. The rear mount 210 and mount 200 may be provided as a single piece, or may be several pieces affixed or joined together. In some embodiments, the hinge R may be a removable hinge or may be adapted to decouple, so that the removal receiver 208 can be disconnected from rear mount 210.

FIG. 17A illustrates the example embodiment in a disengaged configuration. In use, the mount 200 would be near or adjacent to a conductive surface (not shown), and there may be relative movement between the bottom mount 200 and the conductive surface (not shown). The mount 200 is illustrated as including coupling catch 212, which is shaped to receive the bottom of the beam 206 at hinge T.

In FIG. 17B, the angle at hinge S has changed so that the bottom of the beam 206 now encounters the coupling catch 212. The slide 204 may slide past the coupling catch, or two coupling catches 212 may be provided, one on each side of the slide 204. As shown in FIG. 17B, the beam 206 and removal receiver 208 are mechanically at a point where neither end can move farther away from the other. In order to reach the fully engaged configuration of FIG. 17C, an over-center force must again be applied to force the device into the final configuration of FIG. 17C.

From FIG. 17B to FIG. 17C, the bottom of the beam 206 at hinge T cannot move forward so the slide 204 does not move, and, therefore, the brush 202 remains in the same location. During a removal step, therefore, the brush 202 would remain engaged with an adjacent conductive surface, while hinge S would be moved from a first, nearly straight, angle, to the lesser angle of FIG. 17B. This would again allow disengagement of the conductive circuit within the brush holder before the brush 202 disengages a conductive surface, protecting the conductive surface and brush 202 from damage due to arcing.

While the above embodiments are often described in terms of removing or replacing a brush, in some embodiments the primary use of these devices may be to allow a maintenance worker to repair, monitor or otherwise service a commutator, collector ring, or other conductive surface which a brush is designed to engage. For example, not only do brushes wear down over time, but commutators engaged by brushes also exhibit degradation due to wear. It may be useful to easily or reversibly disengage a brush from a commutator to determine the extent of wear and perform repairs.

Additionally, different embodiments of the invention can be suited and sized for use in the particular electrical device in which they are to be incorporated. For example, some embodiments are suited and sized for use in large industrial electrical generators or motors. Some embodiments are particularly well suited and sized for use in power plants, for example power plants having a capacity in the range of about 0.5 to about 900 megawatts, and in some embodiments, power plants having a capacity in the range of about 300 or greater. It should be recognized, however, that the invention is not limited to use in such embodiments.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A brush holder assembly for maintaining a brush in contact with a conductive surface, the assembly comprising:
    a mounting block configured to extend from a stationary base;
    a brush holder for holding a brush, the brush holder being removable from the mounting block;
    a brush for contacting a moving conductive surface, the brush positionable in the brush holder; and
    a spring for biasing the brush into contact with the moving conductive surface, the spring configured to be removably attached to a structural member of the brush holder without rivets, bolts or screws, wherein the spring includes a first end portion and a second end portion; wherein the first end portion is a coiled portion configured to press against the brush; and herein the second end portion includes a hook having a first portion positionable on a first side of the structural member and a second portion positionable on a second side of the structural member.

2. The brush holder assembly of claim 1, wherein the spring includes a retention feature configured to engage with a retention feature of the structural member.

3. The brush holder assembly of claim 1, wherein the spring clips to the structural member.

4. The brush holder assembly of claim 3, wherein the spring includes a hole and the structural member includes a projection extending into the hole.

5. The brush holder assembly of claim 1, wherein the second end portion includes a projection configured to extend into an opening of the structural member.

6. The brush holder assembly of claim 1, wherein the structural member includes a projection configured to extend into an opening in the second end portion of the spring.

7. The brush holder assembly of claim 6, wherein the structural member is a beam configured to slidably engage the mounting block.

8. The brush holder assembly of claim 1, wherein the spring is replaceable without the need of tools.

9. A brush holder assembly for maintaining a brush in contact with a conductive surface, the assembly comprising:
    a brush holder for holding a brush;
    a brush for contacting a moving conductive surface, the brush guided by the brush holder; and
    a spring for biasing the brush into contact with the moving conductive surface, the spring including a first portion having a coil configured to press against the brush and a second portion configured to removably interconnect with and be retained by a structural feature of a structural member of the brush holder, wherein the second portion includes a hook portion configiured to extend around the structural member of the brush holder such that a first portion of the hook portion is positionable on a first side of the structural member and a second portion of the hook portion is positionable on a second side of the structural member.

10. The brush holder assembly of claim 9, wherein the hook portion includes a retention feature configured to engage with the structural feature of the structural member.

11. The brush holder assembly of claim 10, wherein the retention feature of the hook portion is a tab and the structural feature of the structural member is an opening, wherein the tab is configured to extend into the opening.

12. The brush holder assembly of claim 10, wherein the retention feature of the hook portion is a hole and the structural feature of the structural member is a projection configured to extend into the hole of the hook portion.

13. The brush holder assembly of claim 9, wherein the spring is replaceable without the need of tools.

14. The brush holder assembly of claim 9, wherein the spring clips to the structural member.

* * * * *